(12) United States Patent
Kato et al.

(10) Patent No.: US 6,970,317 B2
(45) Date of Patent: Nov. 29, 2005

(54) RECORDING MEDIUM CONTROL METHOD AND RECORDING MEDIUM ADAPTER

(75) Inventors: Tatsuya Kato, Kanagawa (JP);
Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 10/297,708

(22) PCT Filed: Apr. 9, 2002

(86) PCT No.: PCT/JP02/03558

§ 371 (c)(1),
(2), (4) Date: Dec. 6, 2002

(87) PCT Pub. No.: WO02/084664

PCT Pub. Date: Oct. 24, 2002

(65) Prior Publication Data

US 2003/0179485 A1      Sep. 25, 2003

(30) Foreign Application Priority Data

Apr. 9, 2001    (JP)    ............................ P2001-109538

(51) Int. Cl.$^7$ .............................................. G11B 15/18
(52) U.S. Cl. ...................................................... 360/69
(58) Field of Search ................... 360/69, 71; 340/10.1, 340/572.8; 342/42; 710/264, 106; 713/168; 235/487, 383; 700/214

(56) References Cited

U.S. PATENT DOCUMENTS

| 4,839,875 | A | * | 6/1989 | Kuriyama et al. | ............. | 369/14 |
| 5,432,798 | A |   | 7/1995 | Blair | | |
| 5,451,958 | A | * | 9/1995 | Schuermann | ................ | 342/42 |
| 5,550,547 | A | * | 8/1996 | Chan et al. | .................... | 342/42 |
| 5,629,981 | A | * | 5/1997 | Nerlikar | ...................... | 713/168 |
| 6,081,857 | A | * | 6/2000 | Frary | ........................... | 710/74 |

(Continued)

FOREIGN PATENT DOCUMENTS

EP            0 689 151           12/1995

(Continued)

OTHER PUBLICATIONS

Patent Abstracts of Japan, vol. 2000, No. 13, Feb. 5, 2001 & JP 2000 285635 A (Matsushita Electric Ind Co Ltd), Oct. 13 2000.

(Continued)

*Primary Examiner*—David Hudspeth
*Assistant Examiner*—K. Wong
(74) *Attorney, Agent, or Firm*—Frommer Lawrence & Haug LLP; William S. Frommer; Thomas F. Presson

(57) ABSTRACT

This invention provides a recording medium supportable device such as a library device (50), which authenticates each recording medium by identification information such as serial number and controls the recording medium by a command based on radio communication. In this case, a communication identifier like a session identifier corresponding to the identification number is set and provided and the communication identifier is included in a command at the time of execution of control, so that only a specified recording medium to be controlled carries out an operation corresponding to the command. When authenticating the recording medium, the identification information, which is proper information such as serial number, is confirmed through reliable communication using successive communication identifiers, and reliable authentication of the recording medium is carried out by several stages of communication.

6 Claims, 35 Drawing Sheets

U.S. PATENT DOCUMENTS

| | | | |
|---|---|---|---|
| 6,100,788 A * | 8/2000 | Frary | 340/10.1 |
| 6,128,148 A * | 10/2000 | Platte et al. | 360/60 |
| 6,195,007 B1 * | 2/2001 | Takayama et al. | 340/572.1 |
| 6,201,474 B1 * | 3/2001 | Brady et al. | 340/572.8 |
| 6,421,196 B1 * | 7/2002 | Takayama et al. | 360/71 |

FOREIGN PATENT DOCUMENTS

| | | |
|---|---|---|
| EP | 0 978 841 | 2/2000 |
| GB | 2 340 692 | 2/2000 |
| JP | 5-325493 | 12/1993 |
| JP | 10-320515 | 12/1998 |
| JP | 11-120679 | 4/1999 |

OTHER PUBLICATIONS

Patent Abstracts of Japan, vol. 0181, No. 59 (P-1711), Mar. 16, 1994 & JP 5 325493 A (Hitachi Maxell Ltd), Dec. 10, 1993.

Patent Abstracts of Japan, vol. 1999, No. 03, Mar. 31, 1999 & JP 10 320515 A (Kokusai Electric Co Ltd), Dec. 4, 1998.

* cited by examiner

| PREAMBLE (2) | SYNC (3) | LENGTH (1) | DATA (4 or 20) | CRC (2) |

| MANUFACTURE PART | | |
|---|---|---|
| | MANUFACTURE PART CHECKSUM | 1byte |
| | MIC TYPE | 1byte |
| | MIC MANUFACTURE DATE | 4bytes |
| | MIC MANUFACTURE LINE NAME | 8bytes |
| | MIC MANUFACTURE PLANT NAME | 8bytes |
| | MIC MANUFACTURER NAME | 8bytes |
| | MIC NAME | 8bytes |
| | CASSETTE MANUFACTURE DATE | 4bytes |
| | CASSETTE MANUFACTURE LINE NAME | 8bytes |
| | CASSETTE MANUFACTURE PLANT NAME | 8bytes |
| | CASSETTE MANUFACTURER NAME | 8bytes |
| | CASSETTE NAME | 8bytes |
| | OEM CUSTOMER NAME | 8bytes |
| | PHYSICAL TAPE CHARACTERISTIC ID | 2bytes |
| | MAXIMUM CLOCK FREQUENCY | 2bytes |
| | BLOCK SIZE | 1byte |
| | MIC CAPACITY | 1byte |
| | WRITE PROTECT TOP ADDRESS | 2bytes |
| | WRITE PROTECTED COUNT | 2bytes |
| | RESERVED | 1byte |
| | APPLICATION ID | 1byte |
| | OFFSET | 2bytes |

FIG.10

| CARTRIDGE SERIAL NUMBER | | Total 32 bytes (ASCII Code) | |
|---|---|---|---|
| | NUMBER HIGH | 16bytes | ← FIRST BLOCK |
| | NUMBER LOW | 16bytes | ← SECOND BLOCK }  48bytes SERIAL NUMBER |
| CARTRIDGE SERIAL NUMBER CRC | | Total 16bytes | ← THIRD BLOCK |
| | MANUFACTURE ID | 1byte | |
| | SECONDARY ID | 1byte | |
| | CARTRIDGE SERIAL NUMBER CHECKSUM | 1byte | |
| | CARTRIDGE SERIAL NUMBER CRC | 2bytes | |
| | RESERVED | 11bytes | |
| SCRATCH PAD MEMORY | | Total 16 bytes | |
| | SCRATCH PAD MEMORY CHECKSUM | 1byte | |
| | SESSION ID | 1byte | |
| | RESERVED | 14bytes | |

FIG.12

| MANUFACTURE ID | | MANUFACTURE NAME |
|---|---|---|
| ASCII | HEX Value | |
| S | 53h | XYZ CORPORATION |
| OTHER | | RESERVED |

FIG.13A

| SECONDARY ID | | DEFINITION |
|---|---|---|
| ASCII | HEX Value | |
| 1 | 31h | 15m AIT cassette that serial number is smaller equal than a number of 6 figures |
| 2 | 32h | 70m middle length of AIT cassette that serial number is smaller equal than a number of 6 figures |
| 3 | 33h | 170m standard length of AIT cassette that serial number is smaller equal than a number of 6 figures |
| 4 | 34h | 230m standard length of AIT cassette that serial number is smaller equal than a number of 6 figures |
| W | 57h | 230m AIT cassette that serial number is greater equal than a number of 7 figures |
| X | 58h | 170m AIT cassette that serial number is greater equal than a number of 7 figures |
| Y | 59h | 70m middle length of AIT cassette that serial number is greater equal than a number of 7 figures |
| Z | 5Ah | 15m short length of AIT cassette that serial number is greater equal than a number of 7 figures |

FIG.13B

| SESSION ID | DEFINITION |
|---|---|
| 0×00 | FREE STAGE |
| 0×01 | AFTER COMPLETION OF FIRST STAGE OF AUTHENTICATION USING SERIAL NUMBER |
| 0×03 | AFTER COMPLETION OF SECOND STAGE OF AUTHENTICATION USING SERIAL NUMBER |
| 0×07 | AFTER COMPLETION OF THIRD STAGE OF AUTHENTICATION USING SERIAL NUMBER |
| 0×ff | CASSETTE IN AUTHENTICATED TAPE STREAMER DRIVE (AUTHENTICATION USING SERIAL NUMBER) |
| OTHER THAN ABOVE-DESCRIBED | AUTHENTICATED CASSETTE (VALUE OF PROVIDED SESSION IDENTIFIER) |

FIG.14

| COMMAND (REQUEST) | COMMAND CONTENTS | ACKNOWLEDGMENT FROM REMOTE MEMORY IC CORRESPONDING TO COMMAND |
|---|---|---|
| ATN_REQ | IDLE/REGISTER LOADING COMMAND | ATN_ACK |
| STS_REQ | COMMAND FOR INSTRUCTING REPORT OF INTERNAL STATUS | STS_ACK |
| WR_REQ | DATA WRITE COMMAND | WR_ACK |
| RD_REQ | DATA READ COMMAND | RD_ACK |
| DWN_REQ | COMMUNICATION END COMMAND | DWN_ACK |
| ADM_REQ | COMMAND FOR INSTRUCTING TRANSITION TO ISSUE STATE | ADM_ACK |
| WRP_REQ | DATA WRITE COMMAND WHICH IS EFFECTIVE ONLY IN ISSUE STATE | WRP_ACK |
| CMP_REQ | COMPARE COMMAND | CMP_ACK |

ATN_REQ

| 1 | 2 | 3 | 4 | 5 | (byte) |
|---|---|---|---|---|---|
| LEN | OPE | BK L | BK H | 0 | |

FIG.26B

ATN_ACK

| 1 | 2 | 3 | 4 | 5 | (byte) |
|---|---|---|---|---|---|
| LEN | OPE | STS | MDR | I/A (SID) | |

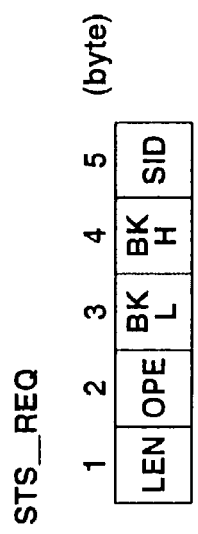
FIG.27A
FIG.27B

DWN_REQ

| | 1 | 2 | 3 | 4 | 5 | (byte) |
|---|---|---|---|---|---|---|
| FIG.30A | LEN | OPE | BK L | BK H | SID | |

DWN_ACK

| | 1 | 2 | 3 | 4 | 5 | (byte) |
|---|---|---|---|---|---|---|
| FIG.30B | LEN | OPE | STS | MDR | I/A (SID) | |

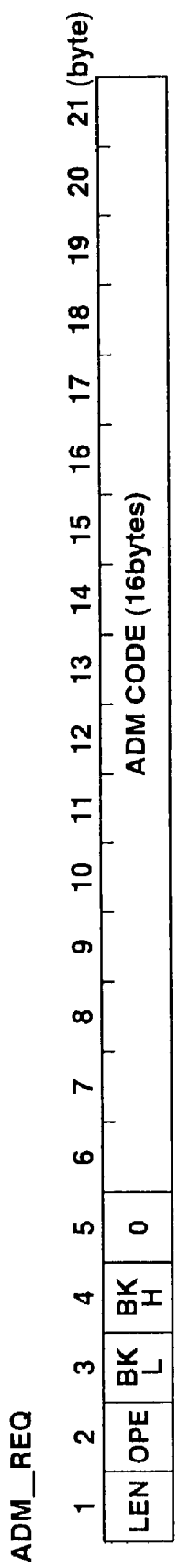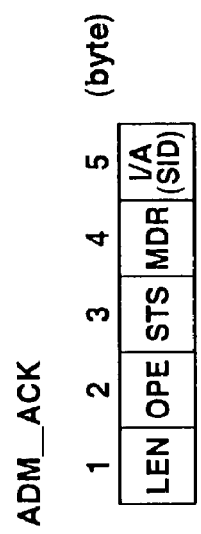
FIG.31A
FIG.31B

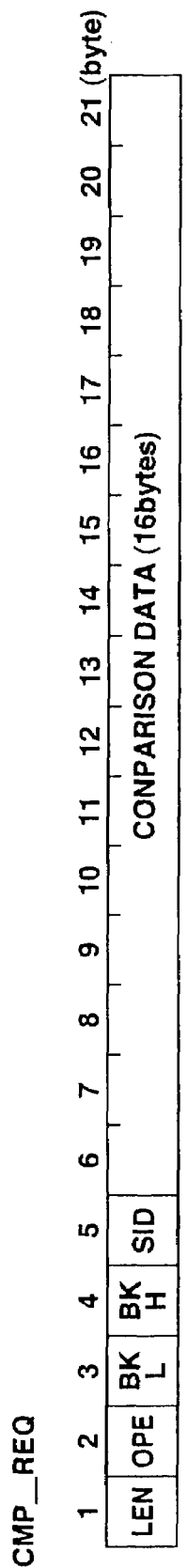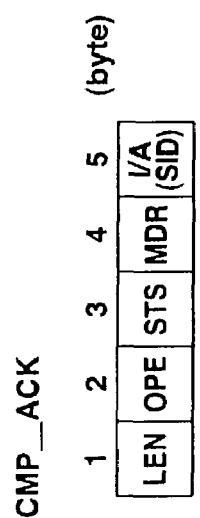

RECORDING MEDIUM CONTROL METHOD AND RECORDING MEDIUM ADAPTER

TECHNICAL FIELD

This invention relates to a device which particularly supports a recording medium having an internal non-contact memory, that is, a tape cassette having housed therein, for example, a magnetic recording medium used for data storage, particularly a magnetic tape, and a controlling method therefor.

BACKGROUND ART

As a drive unit for recording digital data to a magnetic tape and reproducing digital data recorded on the magnetic tape, a so-called tape streamer drive is known. The tape streamer drive of this type enables recording of a large quantity of digital data, for example, approximately several ten to several hundred gigabytes, depending on the tape length of a magnetic tape housed in a tape cassette as a medium. Therefore, this tape streamer drive is broadly used for applications such as backup of data recorded on a medium such as a hard disk of a computer body. Moreover, this tape steamer drive is preferably used in saving image data or the like having a large data size.

As a tape streamer drive as described above, for example, there has been proposed a tape streamer drive adapted for carrying out recording and/or reproduction of data using an 8-mm VTR tape cassette as a recording medium and a helical scan system with a rotary head.

In the tape cassette having a magnetic tape housed therein, which is used for the tape streamer drive of this type, since only the tape medium is a medium for recording data, various data such as data for management and data for system setting are also recorded on the tape, other than main data as a storage object.

In practical applications, a user often wants to read the data in the tape cassette when the tape cassette is not loaded. For example, in a library device having a cassette replacement function such that many tape cassettes are housed in a magazine form and selectively supplied to a tape streamer drive, it is preferred that certain data can be read from an outer casing of the cassette in order to identify the tape cassette to be carried. Therefore, it is considered, for example, to paste a bar code label on the cassette casing so that the library device or the like reads the bar code label using an optical reader or the like, thus enabling discrimination of information for identification, for example, the tape cassette number.

The bar code pasted on the cassette casing is not rewritable and have a small quantity of information. Therefore, it is not suitable for a system which carries out relatively advanced processing.

Meanwhile, for the above-described tape streamer system, a tape cassette having a non-volatile memory housed within a cassette casing is developed. This is adapted for recording management information about recording or reproduction of data to or from a magnetic tape, manufacture information and use history information of the tape cassette and the like, into the non-volatile memory. By doing so, the operating efficiency is much more improved than in the case of recording these management information and the like onto the magnetic tape. Specifically, these management information and the like need to be read and confirmed every time recording/reproduction on the magnetic tape is carried out, and these management information and the like need to be updated after the recording/reproducing operation. If the management information and the like have been recorded at a specific position on the magnetic tape, for example, at the leading end of the magnetic tape, the tape must be wound to the specific position before and after each recording/reproducing operation. This also regulates the position on the tape for carrying out tape loading and unloading operations. However, such inconvenience is eliminated by recording the management information and the like into the non-volatile memory.

The non-volatile memory is accessed by providing a connector terminal which is supported by the tape streamer drive.

Recently, there has been developed a structure such that an antenna and a radio communication circuit are arranged in a tape cassette together with a non-volatile memory and the non-volatile memory is accessed in a non-contact state. That is, a radio communication circuit is arranged in the tape streamer drive or the like and recording/reproduction of data to/from the non-volatile memory can be carried out in a non-contact state to the tape cassette.

In the case of a tape cassette having a non-volatile memory of such a non-contact interface system, it is conceivable to carry out data reading which would be carried out with a bar code, by using the non-volatile memory. For example, when the library device selects a specific tape cassette from a magazine in which many tape cassette are housed, data proper to each tape cassette may be read through radio communication. However, it is practically difficult since radio interference easily occurs from the neighboring tape cassettes because of the radio communication. More advanced processing, such as, an operation for the library device to write management information, is difficult to realize. Particularly, in order to carry out appropriate data writing or reading while preventing radio interference, it is necessary to securely authenticate a tape cassette of a communication partner or a non-volatile memory within the tape cassette and to carry out various communications for actual control after the authentication. Moreover, it is demanded to reduce the quantity of data to be transferred in various communications to the minimum level.

DISCLOSURE OF THE INVENTION

In view of the foregoing status of the art, it is an object of the present invention to provide a magnetic recording medium authenticating method and controlling method and a recording medium supporting method which enable a recording medium supportable device such as a library device to carry out satisfactory advanced control of a recording medium having a memory of a non-contact interface system.

In order to achieve the foregoing object, according to the present invention, there is provided a recording medium controlling method which is carried out by a recording medium supportable device having interface means capable of, with respect to a recording medium having memory means for storing identification information proper to the recording medium and communication means for executing non-contact data transfer with respect to the memory means, non-contact data transfer to/from the memory means by enabling execution of radio communication to/from the communication means. The method comprises: an authentication step of sequentially communicating with the recording medium by using successive communication identifiers, thus confirming the identification information stored in the memory means of the recording medium and authenticating the recording medium; a communication identifier provision step of setting a communication identifier for the recording medium authenticated at the authentication step and providing the communication identifier for the memory means of the recording medium; and a control step of specifying the recording medium by a command including the communication identifier and carrying out operation control of the memory means of the recording medium.

In the recording medium controlling method according to the present invention, at the authentication step, the identification information is confirmed by n stages of communication using first to n-th successive communication identifiers. At the control step, the recording medium is specified by a write or read command including the communication identifier and data transfer is carried out as data writing to or data reading from the memory means of the recording medium.

The communication carried out between the recording medium supportable device and the recording medium at the authentication step, the communication identifier provision step and the control step is executed in accordance with a command from the recording medium supportable device and an acknowledgment from the recording medium in response to the command.

The recording medium controlling method according to the present invention further comprises a communication identifier reset step of resetting to an initial value the communication identifier provided for the memory means at the communication identifier provision step.

According to the present invention, there is also provided a recording medium supportable device which supports a recording medium having memory means for storing identification information proper to the recording medium and communication means for carrying out non-contact data transfer with respect to the memory means. The device comprises: interface means capable of carrying out non-contact data transfer to/from the memory means by executing radio communication to/from the communication means; authentication means for causing the interface means to execute communication with the recording medium by using successive communication identifiers, thus confirming the identification information stored in the memory means of the recording medium and authenticating the recording medium; communication identifier setting means for a communication identifier for the recording medium authenticated by the authentication means and causing the interface means to write the communication identifier to the memory means of the recording medium; and control means for specifying the recording medium by causing the interface means to output a command including the communication identifier, and carrying out operation control of the memory means of the recording medium.

In the recording medium supportable device according to the present invention, the authentication means confirms the identification information by causing execution of n stages of communication between the interface means and the recording medium using first to n-th successive communication identifiers. The control means specifies the recording medium by causing the interface means to output a write or read command including the communication identifier and causes execution of data transfer as data writing to or data reading from the memory means of the recording medium. The communication carried out between the interface means and the recording medium is executed in accordance with a command from the interface means and an acknowledgment from the recording medium in response to the command.

The recording medium supportable device according to the present invention further comprises communication identifier reset means for causing the interface means to output a command for resetting the communication identifier to an initial value, thus resetting to the initial value the communication identifier written in the memory means by the communication identifier setting means.

In the recording medium supportable device according to the present invention, each recording medium is discriminated and thus controlled by using its identification information, for example, unique information such as serial number. In this case, secure communication is carried out by using successive identifiers and n stages of communication using the successive identifiers, thus securely authenticating the recording medium. When the recording medium is authenticated, a communication identifier for subsequent communication is provided for the recording medium and the communication identifier is included in a command for execution of control. Thus, only the specific recording medium to be controlled carries out a corresponding operation in accordance with the command. In short, control of an unintended recording medium due to radio interference on the radio interface is prevented and the communication destination can be specified only by using the communication identifier without using, for example, serial number or the like. Thus, the quantity of communicated data is reduced. By doing so, in addition to discrimination of the recording medium, various and advanced recording/reproducing operations with respect to the memory within the recording medium can be carried out.

The other objects of the present invention and specific advantages provided by the present invention will be further clarified from the following description of a embodiment with reference to the drawings.

BRIEF DESCRIPTION OF THE DRAWINGS

FIG. 10 shows a manufacture part of the remote memory chip.

FIG. 12 shows a cartridge serial number and a scratch pad memory of the remote memory chip.

FIG. 13A shows a manufacturer identifier within the remote memory chip. FIG. 13B shows an exemplary secondary identifier.

FIG. 14 is an explanatory view showing the definition of a session identifier.

FIG. 25 shows commands to the remote memory chip.

FIGS. 26A and 26B show packets related to attention control.

FIGS. 27A and 27B show packets related to a state notification request.

FIGS. 30A and 30B show packets related to the end of communication.

FIGS. 31A and 31B show packets related to related to an issue state instruction.

FIGS. 33A and 33B show packets related to a comparison request.

BEST MODE FOR CARRYING OUT THE INVENTION

Hereinafter, an embodiment of the present invention will be described with reference to the drawings.

The present invention will now be described by using a tape drive unit which uses, as a recording medium, a tape cassette having a non-volatile memory provided therein and which is capable of recording and reproducing digital data with respect to this tape cassette with memory, that is, a tape streamer drive, a library device which houses many tape cassettes therein and can selectively load the tape cassettes into the tape streamer drive, and a data storage system made up of a host computer or the like.

The tape streamer drive and the library device to which the present invention is applied can write and read information through radio data communication to and from the non-volatile memory (remote memory chip) provided within the tape cassette. In this embodiment, the present invention is applied to a remote memory interface, which is a communication device provided in the library device for carrying out radio data communication with the remote memory chip as the non-volatile memory.

The present invention will be described in the following order.

1. Structure of Tape Cassette
2. Structure and Communication System of Remote Memory Chip
3. Data Recorded to Remote Memory Chip
4. Structure of Tape Streamer Drive
5. Structure of Library Device
6. State Transition of Remote Memory Chip
7. Commands to Remote Memory Chip
8. Session Identifier Allocation Processing
9. Data Transfer Processing
10. Processing in Releasing Cassette
11. Various Modifications 1. Structure of Tape Cassette First, a tape cassette used in the tape streamer drive and the library device to which the present invention is applied will be described with reference to FIGS. 1 and 2.

Figure 1:
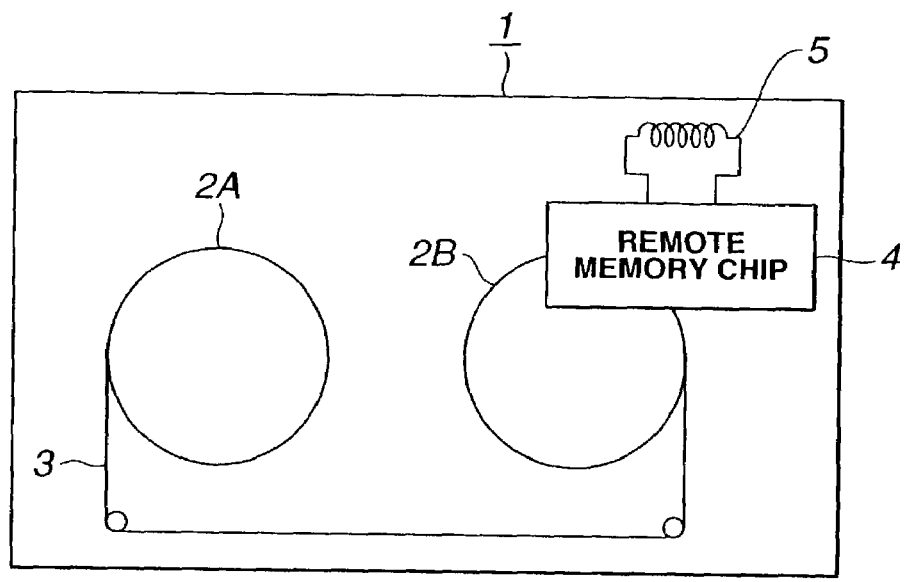
FIG. 1 is an explanatory view schematically showing the internal structure of a tape cassette used in the present invention.

FIG. 1 conceptually shows the internal structure of a tape cassette 1. Inside the tape cassette 1 shown in FIG. 1, reels 2A and 2B are provided and a magnetic tape 3 having a tape width of 8 mm is wound between the reels 2A and 2B. In this tape cassette 1, a remote memory chip 4 is provided which has therein a non-volatile memory and its control circuit system and the like. The remote memory chip 4 can carry out data transmission to and from remote memory interfaces 30, 32 in a tape streamer drive 10 and a library device 50, which will be described later, through communication utilizing electromagnetic induction. The remote memory chip 4 has an antenna 5 for such communication.

As will be described later in detail, manufacture information and serial number information of each tape cassette, the thickness, length and material of the tape, information related to use history or the like of recorded data of each partition, user information and the like are stored in the remote memory chip 4.

In this specification, the various information stored in the remote memory chip 4 is used mainly for various types of management for recording data to the magnetic tape 3 and reproducing the data recorded on the magnetic tape 3. Therefore, such information is also referred to as "management information" as a whole.

In this manner, the non-volatile memory is provided in a cassette casing constituting the tape cassette and the management information is stored into the nonvolatile memory. In the tape streamer drive which supports the tape cassette 1, the interface for writing and reading data to and from the non-volatile memory is provided and the management information related to data recording to/reproduction from the magnetic tape 3 is read from or written to the non-volatile memory. Thus, a recording/reproducing operation to/from the magnetic tape 3 can be efficiently carried out. For example, the magnetic tape need not be rewound, for example, to the tape top when loading or unloading the tape cassette. That is, the tape cassette can be loaded and unloaded with the magnetic tape being at a halfway position. Also, data editing can be carried out by rewriting the management information on the non-volatile memory. Moreover, it becomes easier to set many partitions on the tape and appropriately manage these partitions.

Figure 2:
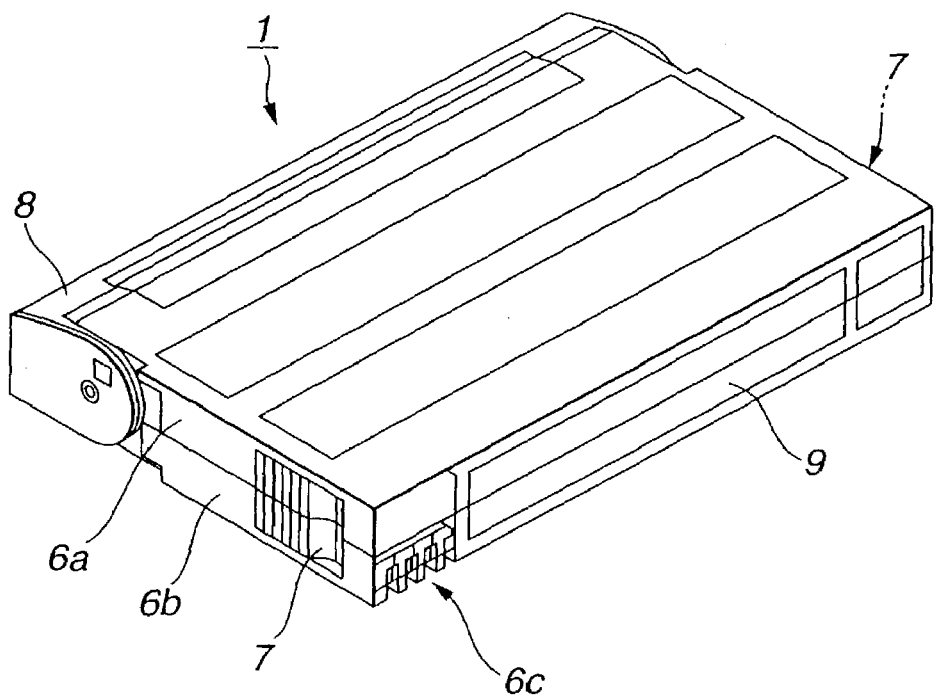
FIG. 2 is a perspective view showing the appearance of the tape cassette.

FIG. 2 is a perspective view showing the appearance of the tape cassette 1 used in the present invention. The cassette casing is made up of an upper case 6a, a lower case 6b and a guard panel 8. Its basic structure is similar to that of a tape cassette used for an ordinary 8-mm VTR. On a label side 9 provided on its one lateral side, which is on the back side of the tape cassette 1, a terminal part 6c is provided. This is a part where an electrode terminal would be arranged in a tape cassette having a contact-type memory provided therein, which is not described in this embodiment. This part of the structure is not necessary in the tape cassette 1 having the non-contact remote memory chip 4 provided therein, as in this embodiment. That is, the terminal part 6c is provided to enable loading to the tape streamer drive or the like, providing compatibility with a tape cassette having a contact memory provided therein. On both lateral sides facing each other of the cassette casing, a recess part 7 is formed. The recess part 7 is used for holding the tape cassette 1, for example, when the library device 50, which will be described later, carries the tape cassette 1.

2. Structure and Communication System of Remote Memory Chip

Figure 3:
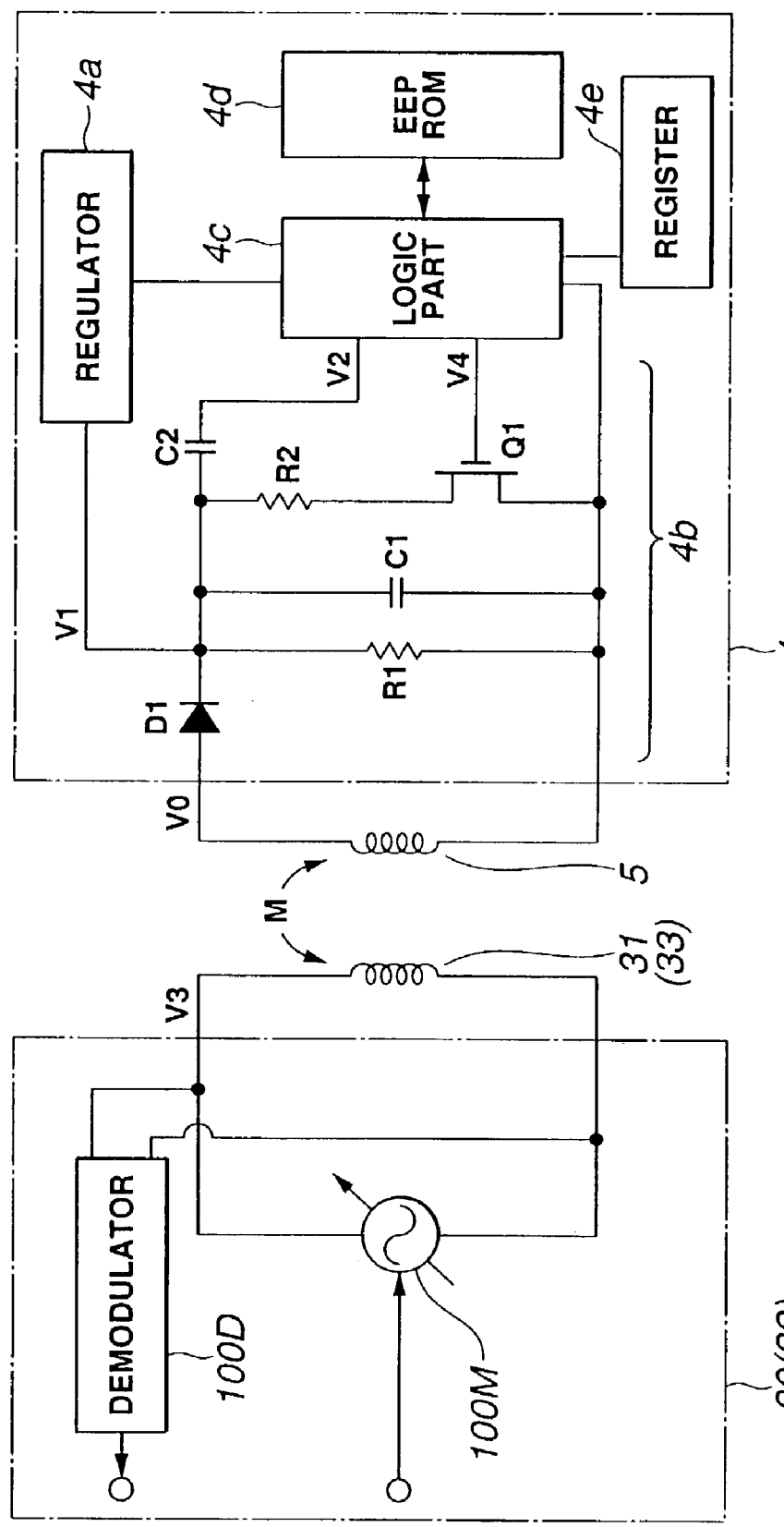
FIG. 3 is a block diagram showing the structure and communication system of a remote memory chip.

FIG. 3 shows the structures of the remote memory chip 4 and the remote memory interface 30 (32) provided in the tape streamer drive or the library device for communicating with the remote memory chip 4. The structure of the remote memory interface 30 (32) in FIG. 3 is shown as conceptual block diagram for explaining the communication system. A specific exemplary structure thereof will be described later as the structure of the remote memory interface 32 with reference to FIG. 23.

The remote memory chip 4, as a semiconductor IC, has a regulator 4a, an RF part 4b, a logic part 4c, an EEP-ROM 4d and a register 4e, as shown in FIG. 3. Such a remote memory chip 4 is mounted on a printed-circuit board fixed inside the tape cassette 1, and a copper foil part on the printed-circuit board forms the antenna 5. The remote memory chip 4 is constituted to receive power supply from outside in a non-contact manner. Communications with the tape streamer drive 10 and the library device 50, which will be described later, use a carrier of, for example, 13.56 MHZ. As the antenna 5 receives an electromagnetic field from the tape streamer drive 10 or the library device 50, the regulator 4a converts the 13.56-MHZ carrier to DC power. The DC power is supplied as an operating power supply to the RF part 4b, the logic part 4d and the register 4e.

In the RF part 4b, for example, a diode D1, resistors R1, R2 and capacitors C1, C2 and a switching element Q1 are connected as shown in FIG. 3. The RF part 4b supplies received information (induced voltage V2) to the logic part 4c and modulates information transmitted from the logic part 4c by a switching control voltage V4. The logic part 4c carries out execution control of decoding of the received signal from the RF part 4b and processing corresponding to the decoded information (command), for example, writing and reading processing of data with respect to the EEP-ROM 4d. In the register 4e, data stored in the EEP-ROM 4d, for example, a session identifier which will be described later, is loaded and its value is added within the transmission data to the remote memory interface 30 (32).

Although FIG. 3 shows the logic part 4c and the register 4e as separate blocks as a matter of convenience for explanation, the register 4e may be actually incorporated in a chip, which is the logic part 4c.

Meanwhile, in the remote memory interface 30 (32), a modulator 100M modulates a 13.56-MHZ carrier by using transmission data and transmission from an antenna 31, 33 to the remote memory chip 4 is carried out. The information transmitted from the remote memory chip 4 is demodulated by a demodulator 100D, thus acquiring its data. Such communication operations between the remote memory chip 4 and the remote memory interface 30 (32) will now be described.

The communication between the remote memory chip 4 and the remote memory interface 30 (32) is fundamentally based on the principle of electromagnetic induction.

Figure 4:
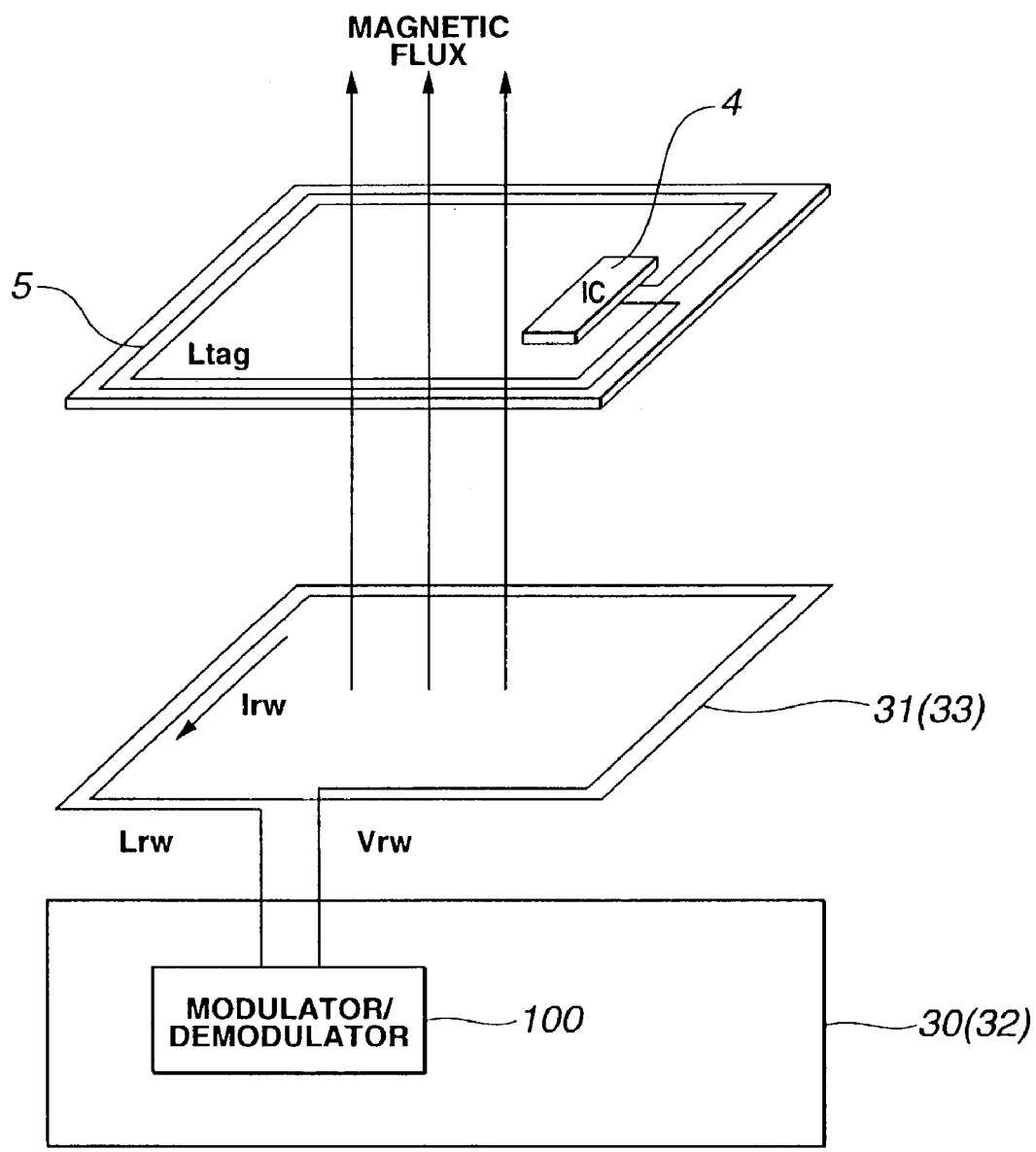
FIG. 4 shows electromagnetic induction of the communication system according to the present invention.

The antenna 31 (33) connected to the remote memory interface 30, 32 is formed by a loop coil Lrw, as shown in FIG. 4. As a current Irw is caused to flow through the antenna 31 (33), a magnetic field is generated on the periphery of the loop coil Lrw. Meanwhile, the antenna 5 connected to the remote memory chip 4 is also formed by a loop coil Ltag. At the end of the loop coil Ltag, an induced voltage is generated by the magnetic field radiated from the loop coil Lrw, and this induced voltage is inputted to the IC, which is the remote memory chip 4. Although the degree of coupling between the antenna 31 (33) and the antenna 5 varies depending on the mutual positional relation, it is considered that these antennas form an M-coupled transformer. Therefore, they may be constituted as a model as shown in FIG. 3.

Although not shown in FIG. 3, a resonance capacitor may be connected with the antennas 5, 31 (33) in order to extend the communication distance. By doing so, when the communication distance is increased and the magnetic field where the loop coil Lrw and the loop coil Ltag are connected is diminished, it can be supplemented by the resonance. Specifically, since the voltage generated in the loop coil Ltag is increased by the resonance, the limit distance is extended within which the power required by the remote memory chip 4 can be obtained. Moreover, since the impedance of the resonance circuit is increased, in the case of transmission, amplitude variance of the loop coil Lrw is transmitted to the loop coil Ltag more efficiently. In the case of reception, impedance variance (which will be described later) of the remote memory chip 4 is transmitted more efficiently.

The magnetic field radiated by the antenna 31 (33) and the induced voltage at the remote memory chip 4 vary depending on the current flowing through the antenna 31 (33). Therefore, in the remote memory interface 30, 32, the modulator 100M modulates the current of the antenna 31 (33), thus enabling data transmission to the remote memory chip 4. That is, the remote memory interface 30, 32 modulates the magnetic field by using transmission data, and the remote memory chip 4 demodulates data from a component passed through the diode D1 and the capacitor C2 of the induced voltage inputted thereto, that is, from an AC component V appearing after rectification.

When returning data to the remote memory interface 30, 32, the remote memory chip 4 carries out an operation to vary the input impedance in accordance with the transmission data. Therefore, no oscillator for data transmission is provided on the side of the remote memory chip 4. That is, the logic part 4c supplies transmission data V4 to the gate of the switching element Q1 and drives the switching element Q1 to switch. Thus, the influence of the resistor R2 on the input impedance is turned on/off, thereby changing the input impedance. When the impedance as viewed from the terminals of the antenna 5 of the remote memory chip 4, the impedance of the M-coupled antenna 31 (33) also changes, thus causing variance of the current Irw and the voltage Vrw between the terminals of the antenna 31 (33). The demodulator 100D of the remote memory interface 30, 32 performs demodulation by the amount of this variance, thus enabling reception of the data from the remote memory chip 4.

The remote memory chip 4 itself does not have a battery and acquired a power-supply voltage from a DC component of a voltage V1 which is after detection of an induced voltage V0 fed to the antenna 5. Since the induced voltage V0 varies depending on the operation of the remote memory chip 4 and the transmission/reception data, the voltage must be stabilized by the regulator 4a in order for the remote memory chip 4 to operate stably. Therefore, when communicating with the remote memory chip 4, the remote memory interface 30, 32 outputs a carrier from the antenna 31 (33) in advance, thereby turning on the power of the remote memory chip 4. The power-on state is maintained until a series of communication accesses (writing and reading) end. During this time, for transmitting a command for writing or reading, the remote memory interface 30 (32) performs ASK modulation of the carrier and transmits command data to the remote memory chip 4. For receiving an acknowledgment from the remote memory chip 4 in response to the transmitted command, the remote memory interface 30, 32 performs ASK demodulation of the carrier to acquire received data. During the period in which an access to the remote memory chip 4 is repeated, the remote memory interface 30, 32 keeps outputting the carrier, thus maintaining the power-on state of the remote memory chip 4. In the remote memory chip 4, a data clock necessary for communication is generated at the logic part 4c by dividing the carrier frequency 13.56 MHZ of the remote memory interface 30, 32.

Figure 5:
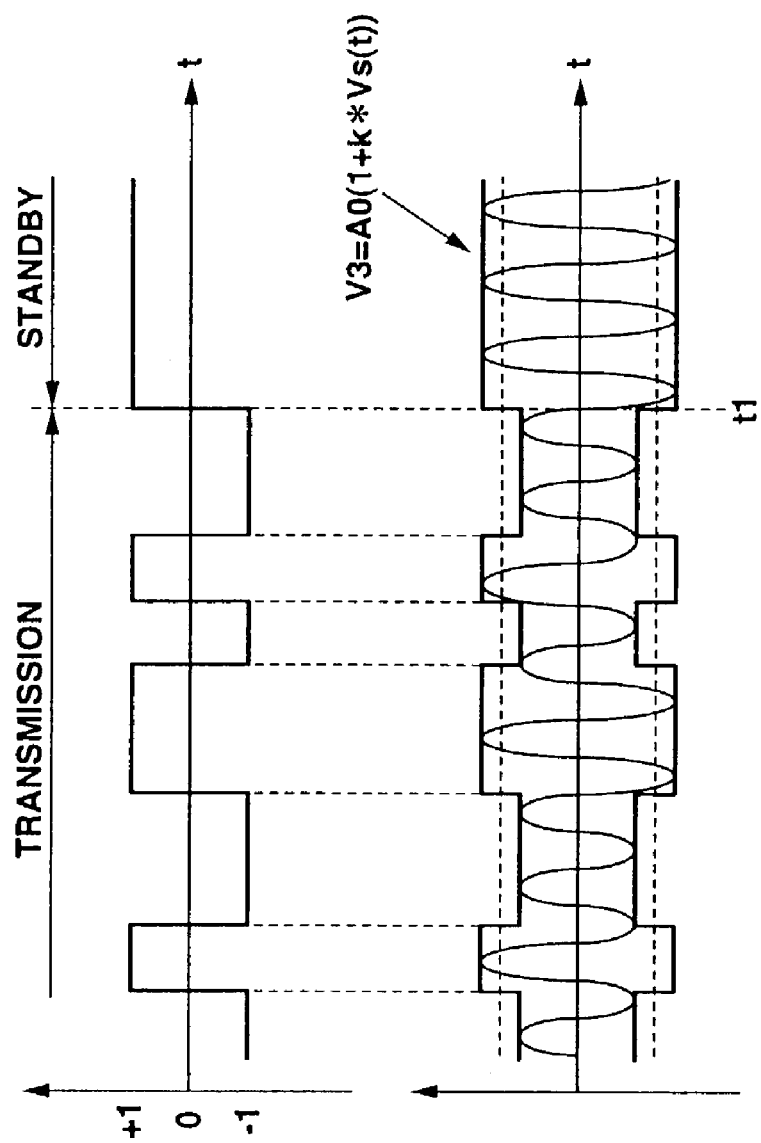
FIGS. 5A and 5B show waveforms of a modulated wave of a transmission data.

In the signal transmitted from the remote memory interface 30, 32 to the remote memory chip 4, the 13.56-MHZ carrier has been ASK-modulated by the transmission data. FIGS. 5A and 5B show an ASK-modulated signal. As a carrier A0 is modulated by transmission data Vs as shown in FIG. 5A, an ASK-modulated signal V3 as shown in FIG. 5B is obtained. This modulated wave V3 is expressed by V3=A0(1+k*Vs(t)).

The degree of ASK modulation is, for example, 15%.

Figure 6:
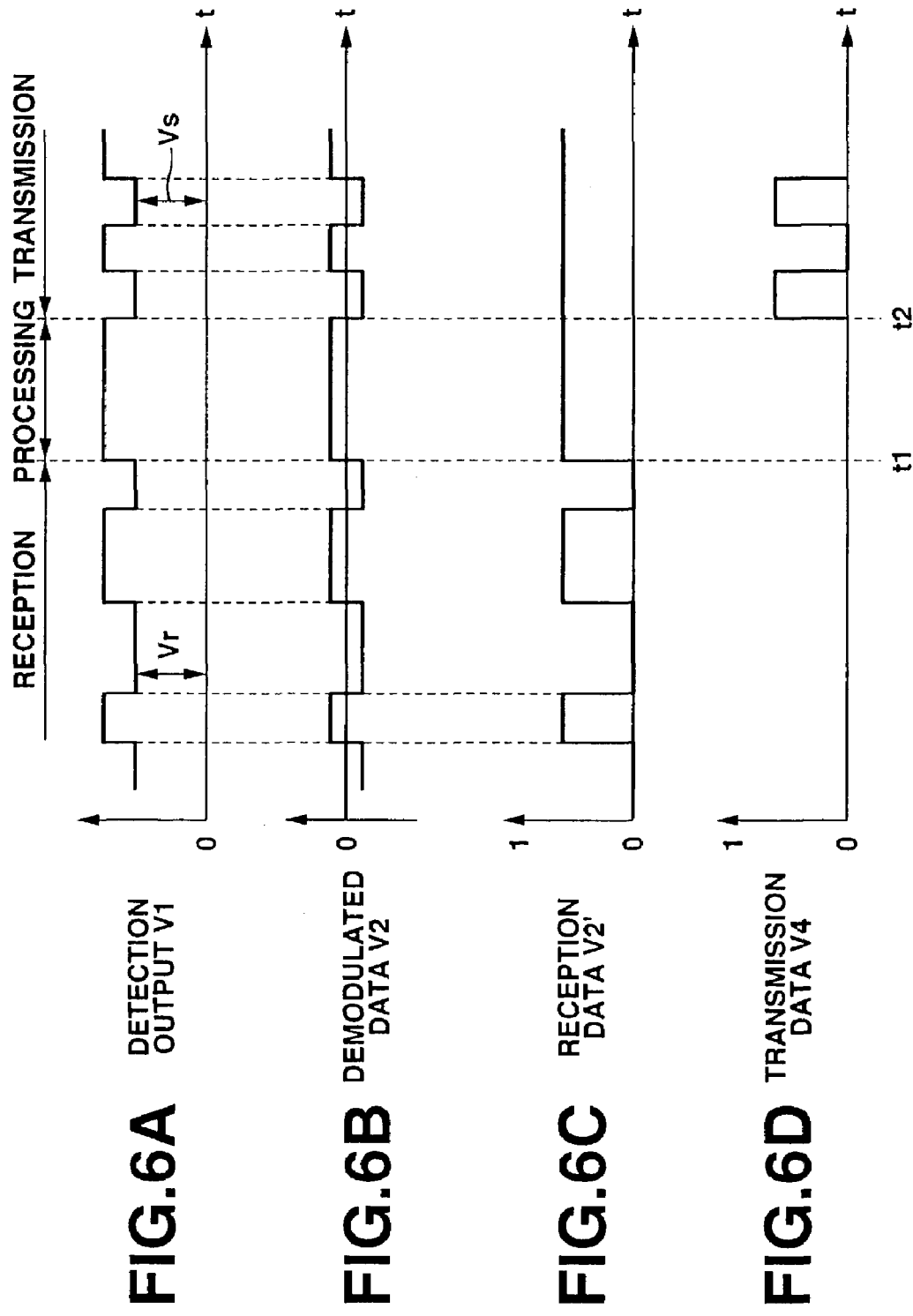
FIGS. 6A to 6D show transmission/reception data.

FIGS. 6A and 6B show a transmission/reception signal of the remote memory chip 4.

The ASK-modulated wave V3 generated by the remote memory interface 30, 32 appears as the induced voltage V0 at the antenna 5 of the remote memory chip 4. The carrier which is envelope-detected by the detection circuit (diode D1) is obtained as a detection output V1 as shown in FIG. 6A. The detection output V1 includes data transmitted by the remote memory chip 4 itself as well as the transmission data from the remote memory interface 30, 32. The detection output VI has its DC component cut by the capacitor C2 and demodulated data V2 as shown in FIG. 6B is inputted to the logic part 4c. The logic part 4c takes OR of the inputted demodulated data V2 and a reception window t1 to restore actual reception data V2' as shown in FIG. 6C. Thus, the transmission data from the remote memory interface 30, 32 is obtained on the side of the remote memory chip 4.

The remote memory chip 4, having received the data, transmits necessary data to the remote memory interface 30, 32 after data processing of a period t1–t2. For example, transmission data V4 is shown in FIG. 6D. As the switching element Q1 is turned on/off by this transmission data V4, the impedance is changed as described above and therefore the data is transmitted to the remote memory interface 30, 32. In this case, the impedance variance rate is, for example, 50% or higher.

On the side of the remote memory interface 30, 32, since the variance of impedance on the side of the remote memory chip 4 causes variance of the current Irw and the voltage Vrw of the M-coupled antenna 31 (33), the variance is detected by the demodulator 100D, thus demodulating the data transmitted thereto. A demodulated wave V3 in this case is expressed by V3=A0*(1+m*V4(t)). Since the degree of coupling of the M-coupling largely depends on the distance between the remote memory chip 4 and the remote memory interface 30, 32, it is appropriate to have a high impedance variance rate on the remote memory chip 4. Also on the side of the remote memory interface 30, 32, the detection output is obtained similarly to FIG. 6A and the reception data as shown in FIG. 6C is obtained by binarizing the signal of FIG. 6B.

The above-described is the data transmitting/receiving operation between the remote memory interface 30, 32 and the remote memory chip 4.

Figures 7, 8:
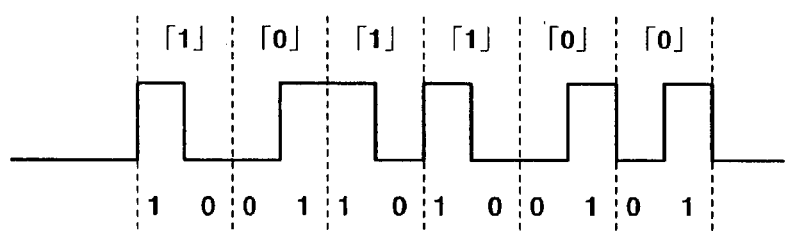
FIG. 7 shows the data structure of the transmission/reception data.
FIG. 8 shows Manchester-coded data.

The data to be transmitted and received has a data structure as shown in FIG. 7. That is, the data is constituted by preamble of 2 bytes, sync of 3 bytes, length of 1 byte, data of 4 or 20 bytes, and CRC of 2 bytes.

The preamble is added for the purpose of carrying out clock synchronization of the data to be transmitted. The preamble is followed by the sync for determination of the start position of the data and determination of the logic. The length represents the data length of the subsequent data. The data is followed by the CRC having the error detection and error correction capabilities.

Meanwhile, the transmission/reception data between the remote memory interface 30, 32 and the remote memory chip 4 is so-called Manchester-coded data. Manchester coding is a kind of BPSK (two-phase modulation), in which data "0" is transmitted as "01" and data "1" is transmitted as "10". Therefore, the signal is easy to handle because no DC component is included in the signal. As a clock for the coding, a frequency obtained by dividing the frequency of the carrier of 13.56 MHZ, that is, approximately 212 KHz, is used. As a result, the bit rate of the transmission/reception data is equivalent to 106 Kbps.

FIG. 8 shows an example of Manchester coding.

If a data string to be transmitted is "101100", it is coded to "01" or "10" in two clocks, thus becoming data "100110100101". Even when data to be transmitted has consecutive "0" or "1", since the carrier is ASK-modulated by "01" or "10", no DC component is included. When modulating the carrier, "01" has "large and small" amplitude, and "10" has "small and large" amplitude.

3. Data Recorded to Remote Memory Chip

The structure of data stored to the EEP-ROM 4d of the remote memory chip 4 will now be described.

"MIC" in the following drawings and description stands for "memory in cassette", that is, the remote memory chip 4.

Figure 9:
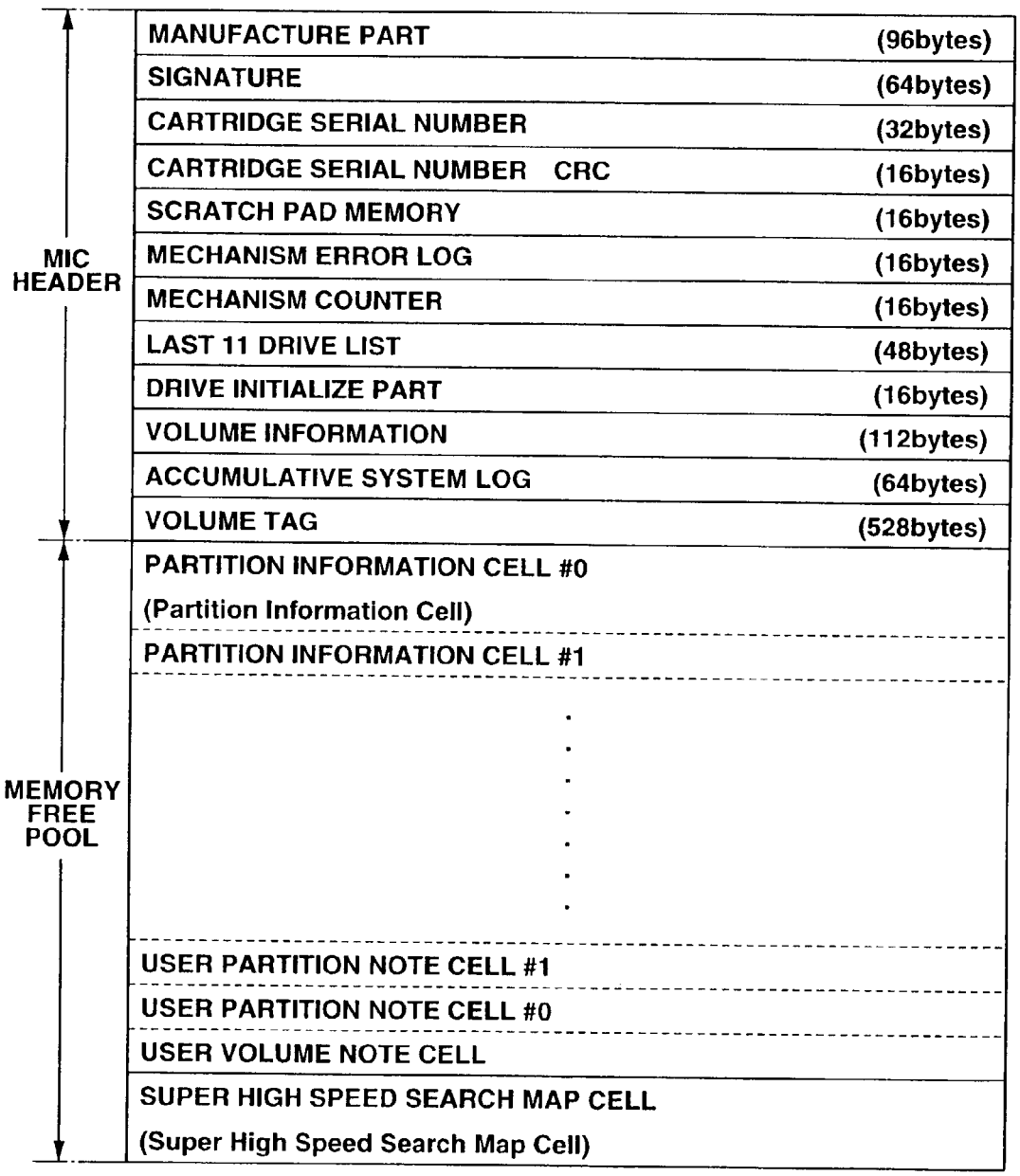
FIG. 9 shows a logical format of the remote memory chip.

FIG. 9 schematically shows an exemplary structure of data stored to the EEP-ROM 4d. In a storage area of the EEP-ROM 4d, a MIC header and a memory free pool are set, as shown in FIG. 9. In these MIC header and memory free pool, various management information is written such as various information at the time of manufacture of the tape cassette, tape information at the time of initialization and information of each partition.

In the MIC header, as shown in FIG. 9, first, 96 bytes are used as a manufacture part in which various information at the time of manufacture of the tape cassette is mainly stored. Subsequently, a signature is described in 64 bytes, and areas of cartridge serial number of 32 bytes, cartridge serial number CRC of 16 bytes and scratch pad memory of 16 bytes are prepared.

Moreover, areas of mechanism error log of 16 bytes, mechanism counter of 16 bytes and last 11 drive list of 48 bytes are prepared. In a drive initialize part of 16 bytes, information at the time of initialization or the like is mainly stored.

Furthermore, for volume information of 112 bytes, an area is provided in which basic management information for the entire tape cassette is stored. For accumulative system log of 64 bytes, an area is prepared in which history information from the time of manufacture of the tape cassette is stored. At the end of the MIC header, an area of volume tag of 528 bytes is prepared. The memory free pool is an area in which additional management information can be stored. In this memory free pool, the proceeding of recording/reproducing operations and various information, if necessary, are stored, and the stored information is updated. A data group as a unit stored in the memory free pool is referred to as a "cell".

In accordance with partitions formed on the magnetic tape 3, partition information cells #0, #1 . . . , which are management information corresponding to the respective partitions, are sequentially written into the memory free pool from its leading end. That is, partition information cells of the same number as the partitions formed on the magnetic tape 3 are formed.

From the trailing end, a user volume note cell and user partition note cells are sequentially written. The user volume note cell is information of comments inputted by the user with respect to the entire tape cassette. The user partition note cells are information of comments inputted by the user with respect to the respective partitions. These are stored when the user designates writing. All of such information is not necessarily described. An intermediate area in which no such information is stored is left as it is, as the memory free pool for later writing.

The manufacture part in the MIC header has a structure, for example, as shown in FIG. 10. The size (number of bytes) of each data is shown on the right side. In the manufacture part, first, as manufacture part checksum of the first 1 byte, checksum information about data of the manufacture part is stored. The information of the manufacture part checksum is provided at the time of manufacture of the cassette. As real data constituting the manufacture part, data from "mic type" to "offset" are described. "Reserved" means an area reserved for future data storage. This also applies to the later description.

"Mic type" is data indicating the type of the MIC (remote memory chip 4) actually provided in the tape cassette. The data "mic manufacture date" indicates the manufacturing year, month, day (and time) of the MIC.

"Mic manufacture line name" represents information about the name of the line on which the MIC was manufactured.

"Mic manufacture plant name" represents information about the name of the plant where the MIC was manufactured.

"Mic manufacturer name" represents information about the name of the manufacturer of the MIC.

"Mic name" represents information about the name of the vendor of the MIC.

"Cassette manufacture date", "cassette manufacture line name", "cassette manufacture plane name", "cassette manufacturer name" and "cassette name" describe information of the cassette itself which is similar to the above-described information related to the MIC.

As "OEM customer name", information about the name of the customer company of OEM (original equipment manufacturer) is stored.

As "physical tape characteristic ID", information about physical characteristics of the magnetic tape, for example, the material, thickness and length of the tape, is described.

As "maximum clock frequency", information indicating the maximum clock frequency to which the MIC corresponds is stored.

As "block size", data length unit information indicating, for example, how many bytes of data can be transferred in one communication with the remote memory interface 30, 32 as a characteristic of the MIC (remote memory chip 4), is described.

As "mic capacity", storage capacity information of the EEP-ROM 4d of the MIC (remote memory chip 4) is described.

"Write protect top address" is used for inhibiting writing in a required part of the area of the MIC, and it indicates the top address of the write-protected area.

"Write protected count" indicates the number of bytes of the write-protected area. That is, an area having the number of bytes indicated by this "write protected count" area, starting at the address designated by the above-described "write protect top address", is set as the write-protected area.

As "application ID", the application identifier is described. "Offset" is also described.

Figure 11:
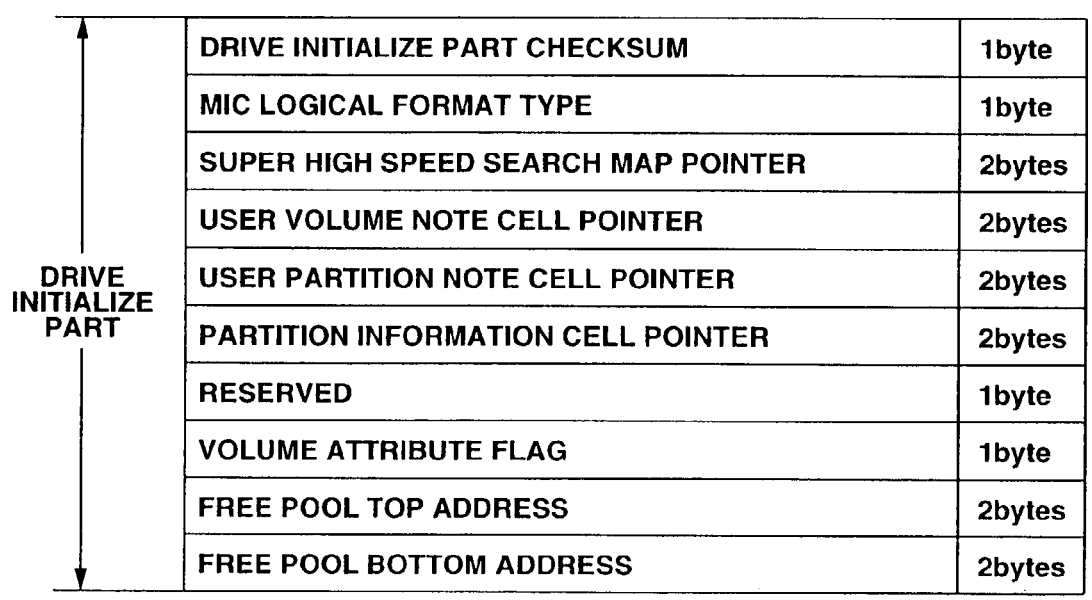
FIG. 11 is an explanatory view showing a drive initializing part of the remote memory chip.

Next, the structure of the drive initialize part in the MIC header will be described with reference to FIG. 11. The size (number of bytes) of each data is shown on the right side.

In the drive initialize part, first, information about checksum with respect to data of this drive initialize part is stored as "drive initialize part checksum".

As real data constituting the drive initialize part, information from "mic logical format type" to "free pool bottom address" is described.

First, as "mic logical format type", the ID number of the logical format of the MIC (remote memory chip 4) is stored. As the MIC format, there are various types of formats related to a firmware update tape MIC format, a reference tape MIC format, a cleaning cassette MIC format and the like, as well as the basic MIC format. The ID number corresponding to the MIC format of the tape cassette is presented.

In "super high speed search map pointer", a pointer indicating the top address of the area of super high speed search map cell shown in FIG. 9 is arranged.

"User volume note cell pointer" indicates the start address of a storage area in which the user can freely write and read data to and from the tape cassette via SCSI, that is, the start address of the user volume note cell shown in FIG. 9.

"User partition note cell pointer" indicates the start address of a storage area in which the user can freely write and read data to and from each partition via SCSI, that is, the start address of the user partition note cell shown in FIG. 9. In some cases, a plurality of user partition note cells are stored, and the user partition note cell pointer indicates the start address of the leading cell of the plurality of user partition note cells.

"Partition information cell pointer" indicates the start address of the partition information cell #0 shown in FIG. 9.

The partition information written into the memory free pool is formed corresponding to the number of partitions formed on the magnetic tape 3. All the partition information cells #0 to #N are connected by the pointers based on a link structure. In short, the partition information cell pointer is assumed as a route indicating the address of the partition #0 and the pointers of the subsequent partition information cells are arranged within the partition information cells immediately before.

As described above, the positions of the respective data within a field FL4 are managed by the respective pointers (super high speed map pointer, user volume note cell pointer, user partition note cell pointer, partition information cell pointer).

"Volume attribute flag" is a flag of 1 bytes for providing a logical write protect tab for the MIC 4.

"Free pool top address" and "free pool bottom address" indicate the start address and the end address of the memory free pool at that time point in the field FL4. Since the area as the memory free pool changes in accordance with writing or erasure of the partition information, the user partition note and the like, the free pool top address and the free pool bottom address are updated accordingly.

The areas of cartridge serial number, cartridge serial number CRC and scratch pad memory, in the MIC header shown in FIG. 9, are shown in detail in FIG. 12.

First, as "cartridge serial number" of 32 bytes, a serial number made up of character information of 32 characters, for example, based on the ASCII code, is stored.

This cartridge serial number is constituted by an upper number of 16 bytes ("cartridge serial number high") and a lower number of 16 bytes ("cartridge serial number low").

The cartridge serial number CRC of 16 bytes is constituted by manufacturer ID of 1 byte, secondary ID of 1 byte, cartridge serial number checksum of 1 byte, cartridge serial number CRC of 2 bytes, and a reserved area of 11 bytes.

As the manufacturer ID, the code number of the manufacturer of the tape cassette as the manufacturer identifier is stored as shown in FIG. 13A.

The secondary ID is a secondary ID corresponding to the type of the tape cassette 1, for example, as shown in FIG. 13B. For example, attribute information of the tape is stored in the form of a code value of 1 byte. The cartridge serial number checksum is checksum information about the above-described cartridge serial number, manufacturer ID and secondary ID. The cartridge serial number CRC is a 2-byte CRC for the cartridge serial number.

The 48 bytes, as a result of combining the cartridge serial number of 32 bytes with the cartridge serial number CRC of 16 bytes, form an individually unique number for each tape cassette which is described at the time of shipment. That is, since there is no tape cassette having the same 48 bytes, this serial number of 48 bytes is used for authentication of the tape cassette with the remote memory chip 4. The 48 bytes, as a result of combining the cartridge serial number and the cartridge serial number CRC, is also referred to simply as "serial number" as a matter of convenience. The authentication processing will be described later in detail. In the case of authentication processing, the serial number of 48 bytes is divided into three blocks each consisting of 16 bytes, in the communication between the remote memory chip 4 and the remote memory interface 30, 32. The first block is "cartridge serial number high" of 16 bytes. The second block is "cartridge serial number low" of 16 bytes. The third block is the whole cartridge serial number CRC of 16 bytes including the manufacturer ID and the like.

The area of scratch pad memory of 16 bytes in total is constituted by scratch pad memory cell of 1 bytes, session identifier of 1 byte (session ID or "SID" for explanation and the drawings), and a reserved area of 14 bytes. The scratch pad checksum is checksum information about data in the scratch pad memory area. The session identifier is a communication identifier provided for the remote memory chip 4 as a result of authentication processing, which will be described later.

In this embodiment, in order for the remote memory interface 30, 32 to communicate with the remote memory chip 4, for example, authentication of the remote memory chip 4 is carried out at the library device 50 and a session identifier is provided accordingly. Then, when accessing the remote memory chip 4, the session identifier of 1 byte is contained in a command, thus specifying the specific tape cassette (remote memory chip 4) and carrying out accurate communication. The session identifier provided from the library device 50 or the like is stored into the area of scratch pad memory in the EEP-ROM 4d.

The session identifier of 1 byte used in this embodiment is defined as shown in FIG. 14.

If "00000000" to "11111111", each of which is 1 byte, are expressed by hexadecimal values of "0x00" to "0xff" (numerical value with Ox are hexadecimal expressions), "0x00" indicates that no session identifier is allocated (that is, free state or initial state). Specifically, in the remote memory chip 4 of the tape cassette on which session identifier allocation processing, as will be described later, has not been performed, a value equivalent to the session identifier in its EEP-ROM 4d is "0x00".

"0x01", "0x03" and "0x07" are successive session identifiers in the communication for authentication processing, which will be described later. As will be described later in detail, at the time of completion of the first stage of the authentication processing using the serial numbers, the session identifier arranged in the communication data is "0x01". At the time of completion of the second stage, the session identifier is "0x03". At the time of completion of the third stage, the session identifier is "0x07".

"0xff" is a value of the session identifier in the case where the tape streamer drive 10 carries out authentication and provides the session identifier to the tape cassette loaded on the tape streamer drive 10, which will be described later.

When the tape cassette 1 having a session identifier in the free state "0x00" is loaded, the tape streamer drive 10 carries out authentication processing and provides a session identifier "0xff", thus communicating with the remote memory chip 4. In this case, for ejecting the tape cassette 1, the tape streamer drive 10 carries out processing to restore the session identifier in the free state "0x00". However, if the tape cassette is authenticated by the library device 50 and provided with a session identifier by the library device 50, the tape streamer drive 10 may communicate with the remote memory chip 4 using that session identifier. Of course, in this case, the session identifier of "0x00" need not be restored at the time of ejection.

The other values of session identifiers than the above-described values, that is, "0x02", "0x04", "0x06", "0x08" to "0xfe", are the values of actual session identifiers which are already authenticated and allocated. That is, if the result of authentication using the serial numbers is OK, the library device 50 allocates one of these values as a session identifier to the authenticated remote memory chip 4. For example, the values are selectively provided so that no duplication of the same value occurs on the tape cassettes within the library device 50. In communicating with the remote memory chip 4 of any specific tape cassette, its session identifier is used.

4. Structure of Tape Streamer Drive

The tape streamer system of this embodiment is constituted by the tape streamer drive 10 for carrying out recording to and reproduction from the magnetic tape 3 of the above-described tape cassette 1, the library device 50 which houses many tape cassettes 1 therein and can selectively load these tape cassettes 1 into the tape streamer drive 10, and a host computer 40 for controlling the operations of these units. The library device 50 and the tape streamer drive 10 can communicate with the remote memory chip 4 of the tape cassette 1.

The structure of the tape streamer drive 10 will now be described with reference to FIG. 15. This tape streamer drive 10 is adapted for carrying out recording to/reproduction from the magnetic tape 3 of the tape cassette 1 in accordance with a helical scan system.

Figure 15:
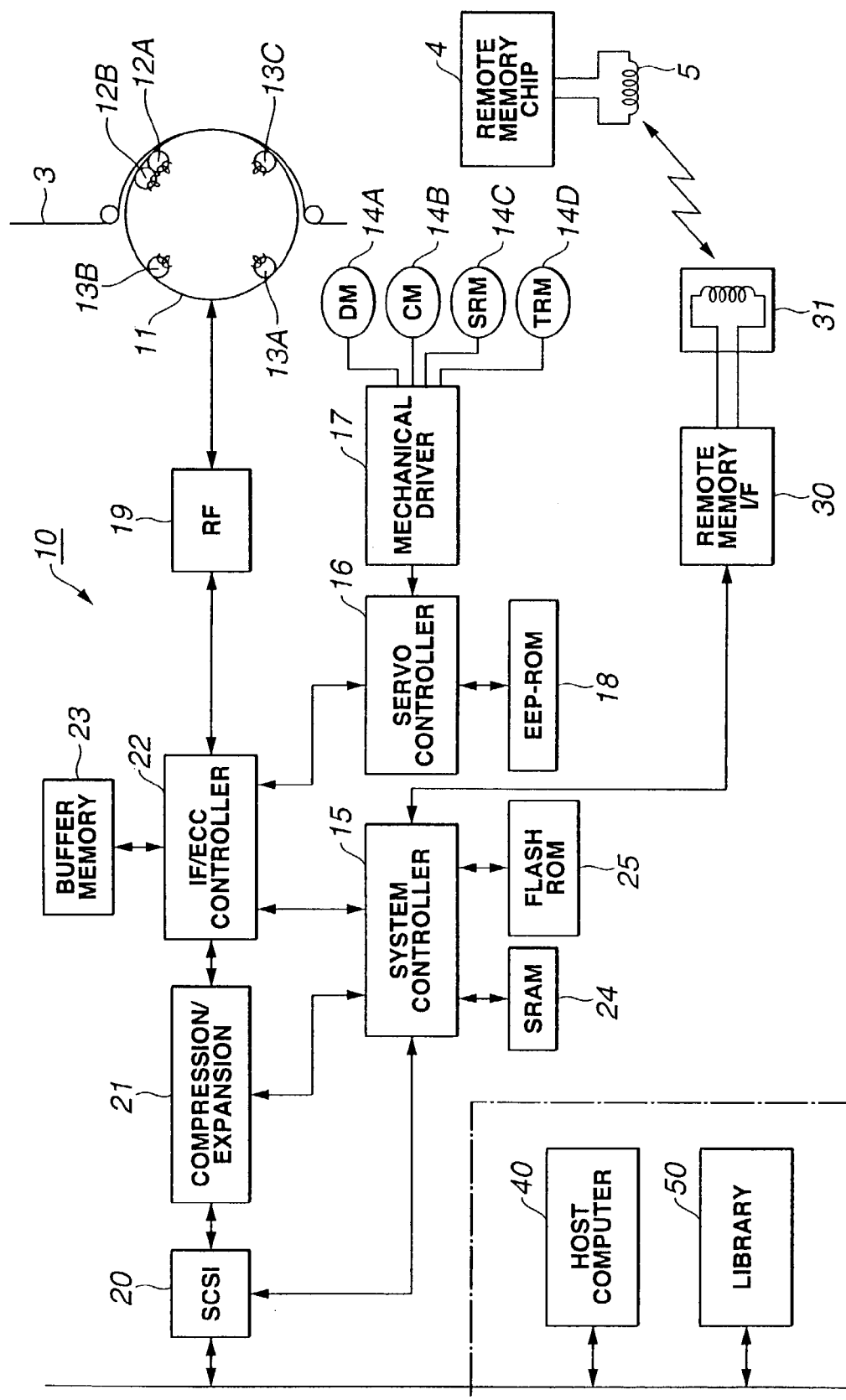
FIG. 15 is a block diagram showing a tape streamer drive.

As shown in FIG. 15, for example, two recording heads 12A, 12B and three reproducing heads 13A, 13B, 13C are provided on a rotary drum 11 of the tape streamer drive 10.

The recording heads 12A, 12B have such a structure that two gaps having different azimuth angles are arranged very closely to each other.

The reproducing heads 13A, 13B (13C) are heads having different azimuth angles (13B and 13C have the same azimuth angles), and are arranged away by 90 degrees from each other. These reproducing heads 13A, 13B, 13C are also used for reading immediately after recording (so-called read-after-write).

The rotary drum 11 is rotated by a drum motor 14A and the magnetic tape 3 lead out from the tape cassette 1 is wound on the rotary drum 11. The magnetic tape 3 is fed by a capstan motor 14B and a pinch roller, not shown. The magnetic tape 3 is wound on the reels 2A, 2B as described above, and the reels 2A, 2B are rotated forward and backward by reel motors 14C, 14D, respectively.

The drum motor 14A, the capstan motor 14B and the reel motors 14C, 14D are rotationally driven by application of power from a mechanical driver 17. The mechanical driver 17 drives each motor under the control of a servo controller 16. The servo controller 16 performs rotation speed control of each motor, thus causing execution of tape traveling in normal recording/reproduction, tape traveling in high-speed reproduction, and tape traveling in fast-forward or rewind.

In an EEP-ROM 18, constants used for servo control of the respective motors by the servo controller 16 are stored.

The servo controller 16 is bidirectionally connected with a system controller 15 which execute control processing of the entire system via an interface controller/ECC formatter 22 (hereinafter referred to as IF/ECC controller).

In this tape streamer drive 10, a SCSI interface 20 is used for data input/output. For example, when recording data, the data is sequentially inputted from the host computer 40 via the SCSI interface 20 by using a fixed-length transmission data unit called "record" and is supplied to a compression/expansion circuit 21. In such a tape streamer drive system, there also exists a mode in which data is transmitted from the host computer 40 by using a variable-length data set unit.

The compression/expansion circuit 21 performs compression processing of the inputted data on the basis a predetermined system, if necessary. If an exemplary compression system based on LZ code is employed, a dedicated code is allocated to a character string which was processing in the past and the character string with the code is stored in the form of a dictionary. Then, a character string which is inputted later is compared with the contents of the dictionary, and if the character string of the input data is coincident with a code in the dictionary, this character string data is replaced by the code in the dictionary. Data of an input character string which is coincident with any code in the dictionary is sequentially given a new code and registered to the dictionary. By thus registering data of input character strings and replacing character string data with the codes in the dictionary, data compression is carried out.

The output of the compression/expansion circuit 21 is supplied to the IF/ECC controller 22. The IF/ECC controller 22 temporarily stores the output of the compression/expansion circuit 21 into a buffer memory 23, by its control operation. The data stored in the buffer memory 23 is ultimately handled as a fixed-length unit called "group" equivalent to 40 tracks on the magnetic tape under the control of the IF/ECC controller 22, and ECC format processing of this data is carried out.

As the ECC format processing, an error correcting code is added to the recording data and modulation processing of the data is carried out so that the data is adapted for magnetic recording. The resulting data is supplied to an RF processing unit 19.

The RF processing unit 19 performs processing such as amplification and recording equalization of the supplied recording data to generate a recording signal, and supplies the recording signal to the recording heads 12A, 12B. Thus, recording of the data to the magnetic tape 3 from the recording heads 12A, 12B is carried out.

The data reproducing operation will be briefly described. The recording data on the magnetic tape 3 is read out as an RF reproducing signal by the reproducing heads 13A, 13B, and reproducing equalization, reproducing clock generation, sampling and decoding (for example, Viterbi decoding) of the reproduction output are carried out by the RF processing unit 19.

The signal thus read out is supplied to the IF/ECC controller 22, where error correction processing or the like is carried out first. Then, the signal is temporarily stored in the buffer memory 23, read out at a predetermined time point, and supplied to the compression/expansion circuit 21.

On the basis of the determination by the system controller 15, the compression/expansion circuit 21 performs data expansion processing in the case of data compressed by the compression/expansion circuit 21 at the time of recording. In the case of non-compressed data, the compression/expansion circuit 21 directly passes and outputs the data without performing data expansion processing. The output data of the compression/expansion circuit 21 is outputted as reproduction data to the host computer 40 via the SCSI interface 20.

In FIG. 15, the remote memory chip 4 in the tape cassette 1 is shown. As the whole tape cassette 1 is loaded onto the tape streamer drive, data input/output between the remote memory chip 4 and the system controller 15 in a non-contact state via the remote memory interface 30 is made possible. The remote memory interface 30 carries out the above-described communication with the remote memory chip 4 by using the antenna 31. Thus, the system controller 15 can execute access for writing or reading of data to or from the remote memory chip 4.

The data transfer to and from the remote memory chip 4 is carried out in the form of a command from the equipment side and an acknowledgment from the remote memory chip 4 in response to the command. When the system controller 15 issues a command to the remote memory chip 4, the command data is encoded to the data structure of FIG. 7 by the remote memory interface 30, then ASK-modulated as described above, and transmitted. On the tape cassette 1 side, the transmission data is received by the antenna 5 and the logic part 4c carries out an operation in accordance with the contents designated by the received data (command), as described above. For example, data transmitted together with a write command is written to the EEP-ROM 4d.

When the command is thus issued from the remote memory interface 30, the remote memory chip 4 issues an acknowledgment corresponding to the command. That is, the logic part 4c of the remote memory chip 4 causes the RF part 4b to modulate data as an acknowledgment, and transmits and outputs the modulated data from the antenna 5. As such an acknowledgment is received by the antenna 31, the received signal is demodulated by the remote memory interface 30 and supplied to the system controller 15. For example, in the case where a read command is issued from the system controller 15 to the remote memory chip 4, the remote memory chip 4 sends a code which is an acknowledgment corresponding to the read command, together with data read out from the EEP-ROM 4d. Then, the acknowledge code and the read-out data are received and demodulated by the remote memory interface 30 and supplied to the system controller 15.

Since the tape streamer drive 10 has the remote memory interface 30 as described above, the tape streamer drive 10 can access the remote memory chip 4 in the tape cassette 1.

In such non-contact data exchange, the data is superimposed on a 13-MHZ band carrier by ASK modulation, but the original data is packeted data. That is, a header, a parity and other necessary information are added to data as a command or acknowledgment so as to form a packet, and the packet is code-converted and then modulated, thus enabling transmission/reception of a stable RF signal.

In an SRAM 24 and a flash ROM 25, data used by the system controller 15 for various processing are stored. For example, constants used for control are stored in the flash ROM 25. The SRAM 24 is used as a work memory, or as a memory for storage and arithmetic processing of data read out from the remote memory chip 4, data to be written to the remote memory chip 4, mode data set for each tape cassette, various flag data and the like.

The SRAM 24 and the flash ROM 25 may be constituted as internal memories in a microcomputer forming the system controller 15. Alternatively, a part of the area of the buffer memory 23 may be used as the work memory 24.

Between the tape streamer drive 10 and the host computer 40, mutual transmission of data is carried out by using the SCSI interface 20 as described above. To the system controller 15, the host computer 40 carries out various communications using SCSI commands.

5. Structure of Library Device

The library device 50 will now be described.

Figure 16:
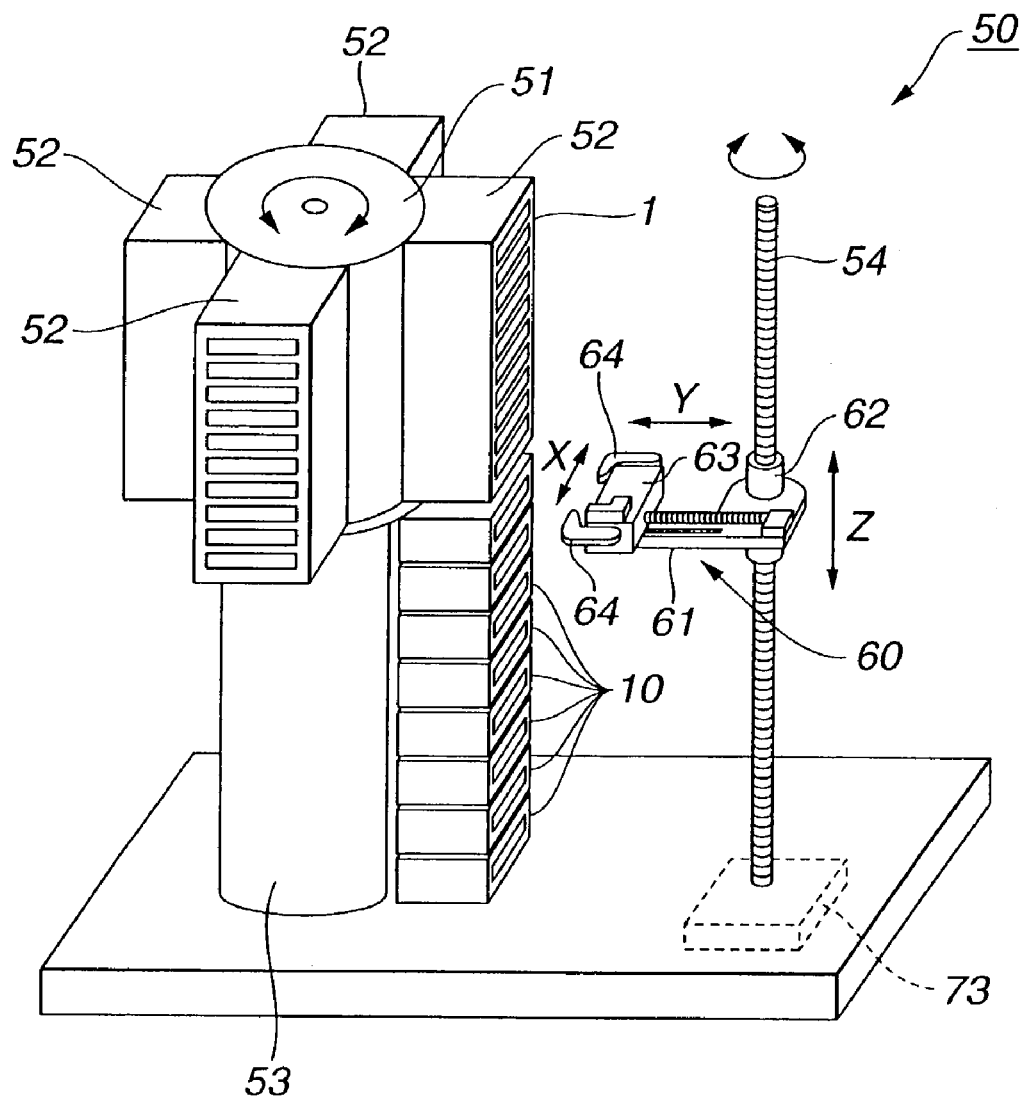
FIG. 16 is a perspective view showing a library device.
Figure 17:
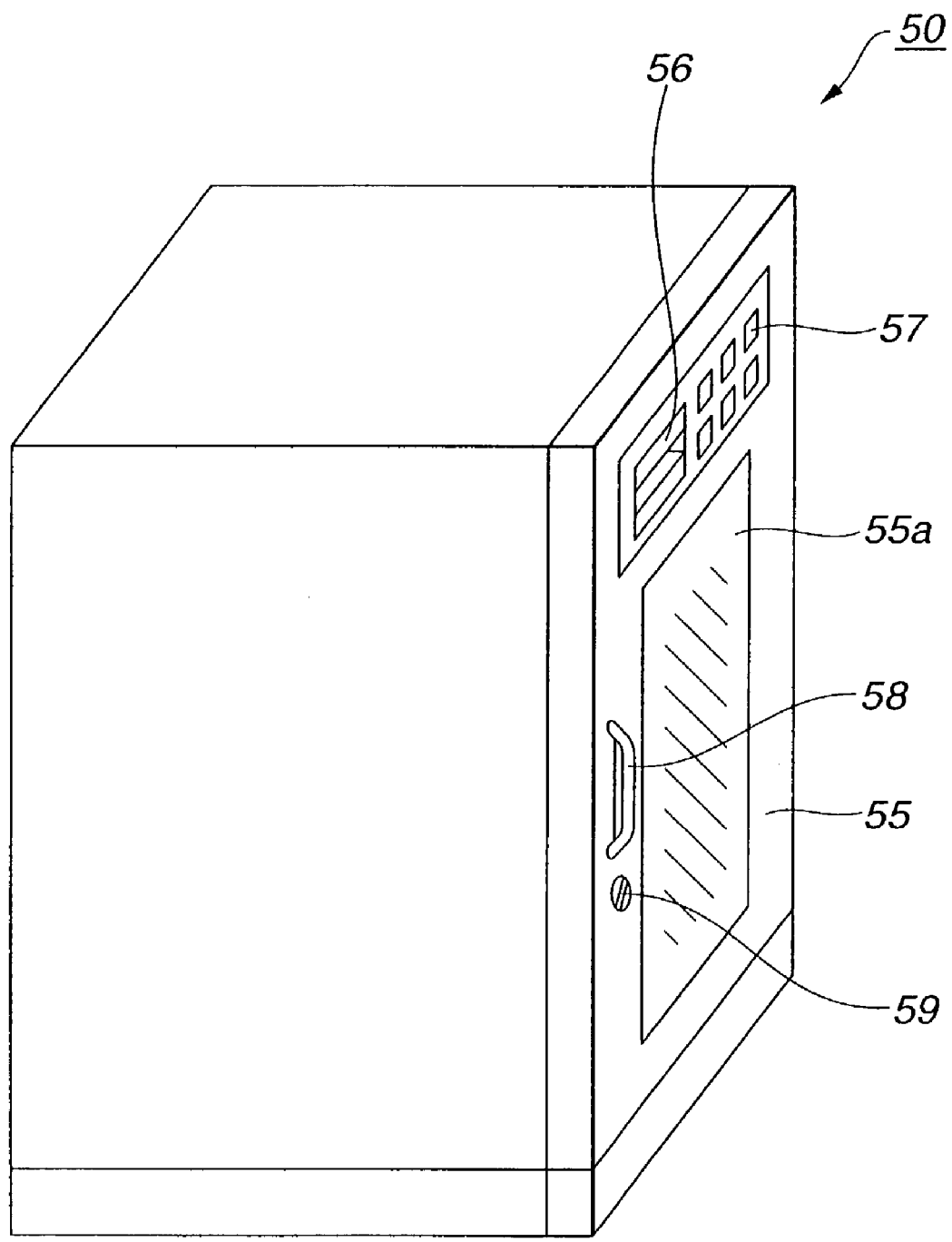
FIG. 17 is a perspective view showing the appearance of the library device.

FIG. 17 shows the appearance of an outer casing box of the library device 50. FIG. 16 shows a mechanical part of the library device 50 arranged in the outer casing box.

First, an exemplary mechanism of the library device 50 will be described with reference to FIG. 16.

In the library device 50, a carousel 51 which has, for example, four magazines 52 mounted thereon, is rotatably arranged on a controller box 53, with each magazine 52 being capable of housing, for example, approximately 15 tape cassettes, as shown in FIG. 16. As the carousel 51 is rotated, one of the magazines 52 is selected. A hand unit 60 for housing and taking out the tape cassette 1 to and from the magazine 52 is provided to be movable in a vertical direction indicated by an arrow Z in FIG. 16 along a Z-shaft 54. Specifically, as a gear groove is formed on the Z-shaft 54 and a bearing part 62 of the hand unit 60 is engaged with the gear groove, the Z-shaft 54 is rotated by a Z-motor 73, thus moving the hand unit 60.

In the hand unit 60, a hand table 63 is mounted on a stand 61 so that the hand table 63 is movable in a Y-direction, and a pair of hands 64 are formed at the distal end of the hand table 63. This pair of hands 64 can hold and release the tape cassette 1 by closing and opening in an X-direction. Moreover, a plurality of tape streamer drives 10 are arranged in a lower part of the carousel 51. Each tape streamer drive 10 has the above-described structure shown in FIG. 15.

With such a mechanism, the hand unit can take out the tape cassette 1 from desired one of the magazines 52 on the carousel 51 and can carry and load the tape cassette 1 onto desired one of the tape streamer 10. On the other hand, the hand unit can house the tape cassette 1 taken out from given one of the tape streamer drives 10 to a desired position in the desired magazine.

With respect to the outer casing box which houses this mechanism, substantially an entire front side forms a front door 55 and it can be opened and closed by using a handle 58 thereon, as shown in FIG. 17. The front door 55 can be locked by using a lock 59. Moreover, a portion as a transparent panel 55a is provided on the front door 55 so that its inside can be visually checked.

On an upper part of the front door 55, an operating panel 57 and a port 56 are formed. The port 56 is formed to add or take out the tape cassette 1 when the front door 55 is kept closed. Although not shown in FIG. 16, the tape cassette 1 inserted from the port 56 can be carried by the hand unit 60 to a required position in the magazine 52. The hand unit 60 also can eject from the port 56 the tape cassette 1 which the hand unit 60 is carrying.

On the operating panel 57, various keys to be operated by the user are arranged. Key operation information of this operating panel 57 is inputted to a library controller 80, which will be described later, and a corresponding operation is executed under the control of the library controller 80. The user's operations using the operating panel 57 may include insertion/ejection of the tape cassette 1 through the port 56, designation of an adjustment operation of the library operation 50 and the like.

Figure 18:
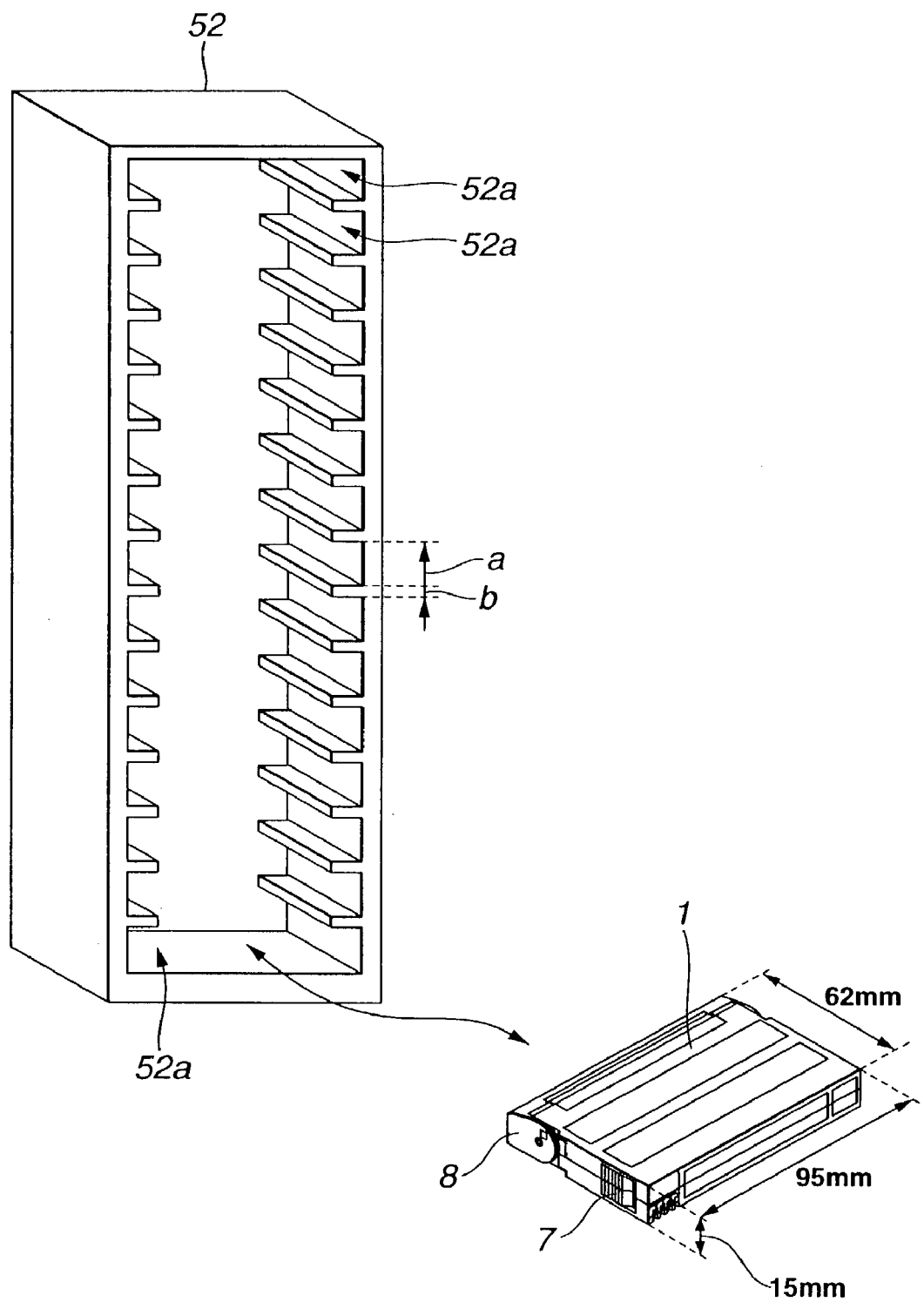
FIG. 18 is a perspective view showing a magazine constituting the library device together with the tape cassette.

The structure of the magazine 52 is shown in FIG. 18.

In each magazine 52, approximately 15 housing parts 52a are formed and the tape cassette 1 can be housed in each housing part 52a. The housing part 52a is set to such a size that the user can easily put the tape cassette 1 therein and that it has a certain force for holding the tape cassette 1 to prevent detachment of the tape cassette 1 when the carousel 51 is rotated. Moreover, the housing part 52a is so constituted that the tape cassette 1 can be easily taken out by the hands 64. For example, since the tape cassette 1 has a thickness of approximately 15 mm, the height a of each housing part 52a is set to approximately a=16 mm. The partition size b of the housing part 52a is set to, for example, approximately b=3 mm, considering that many housing parts 52a can be formed by reducing the partition size b while the strength can be secured by having a somewhat thick partition.

The housing part 52a is set to a such a depth that in the state where the tape cassette 1 is housed in the housing part 52a, the back side of the tape cassette 1 slightly protrudes outward. Specifically, referring to FIG. 19, which shows the tape cassette 1 in the magazine 52 as viewed in a planar direction, the tape cassette 1 is housed with its back side protruding, as a portion denoted by d in FIG. 19. In this case, for example, this portion is set to approximately d=20 mm. This enables easy engagement of the distal ends of the hands 64 with the recess parts 7, 7 on both lateral sides of the tape cassette 1.

The structure and operation of the hand unit 60 will now be described with reference to FIGS. 19, 20 and 21.

Figure 19:
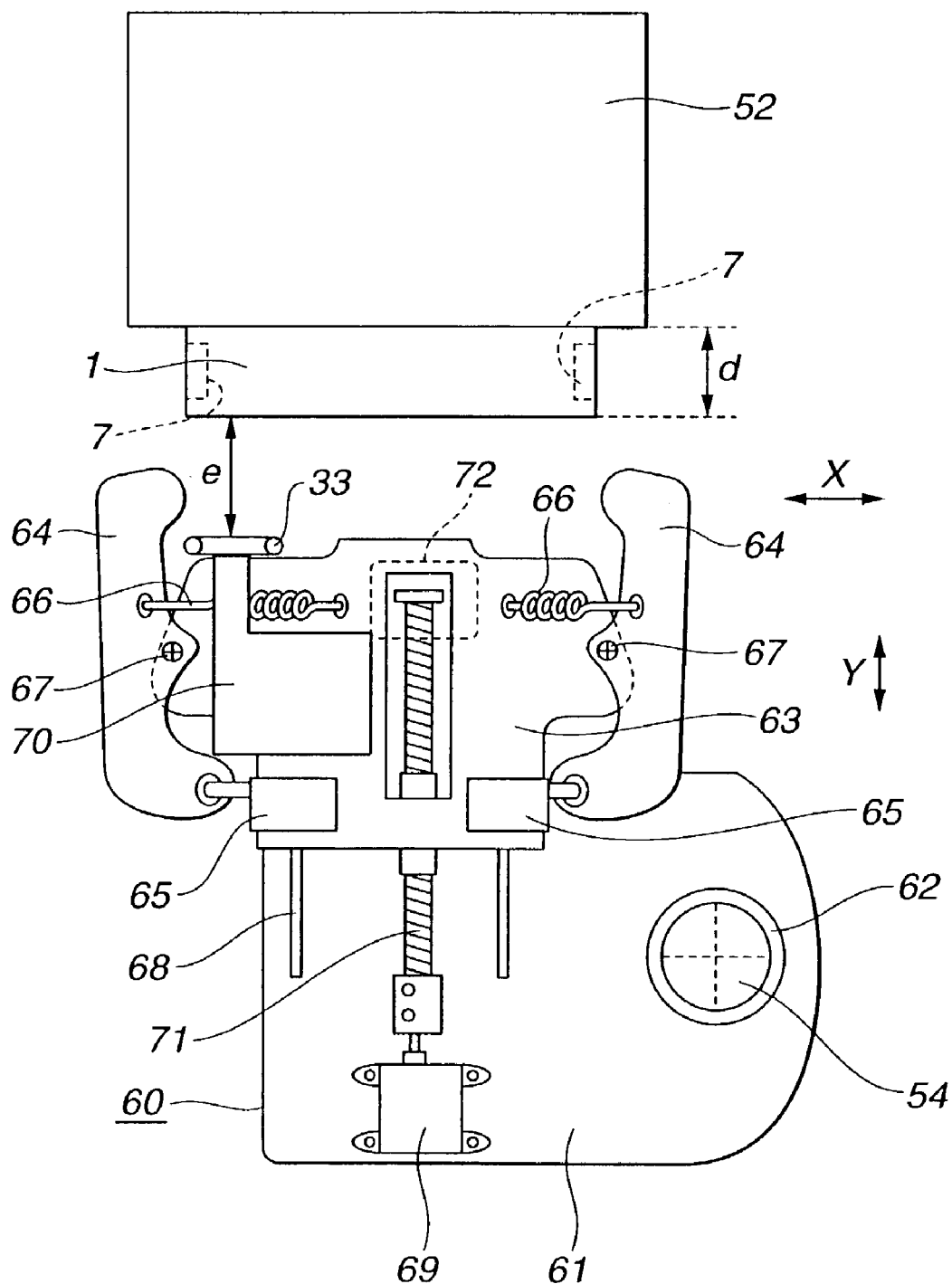
FIG. 19 is a plan view showing a hand unit constituting the library device.

FIG. 19 shows the state where the hand unit 60 is at a position corresponding to and away from a given tape cassette 1. FIG. 20 shows the state where the hand unit 60 holds the tape cassette 1. FIG. 21 shows the state of FIG. 20, as viewed from its lateral side.

In the hand unit 60, the hand table 63 movably is mounted on the stand 61 and the hands 64, 64 are mounted on the hand table 63, as described above. First, as the entire hand unit 60 is held by the Z-axis 54 in the state where the bearing part 62 provided on the stand 61 is engaged with the Z-shaft 54, the hand unit 60 is moved in the vertical direction by the rotation of the Z-shaft 54, and at this point, the hand unit 60 is positioned to a position facing a given housing part 52a in the magazine 52 or a given tape streamer drive 10.

As the bearing part 62 is formed at a position deviated from the magazine 52 as viewed from the direction of the front door 55, the Z-shaft 52 will not be an obstacle when the front door 55 is opened to house or take out the tape cassette 1 into or from the magazine 52.

The hand table 63 is movable along guide rails 68 on the stand 61. Specifically, a Y-shaft 71 having a gear groove is engaged with the hand table 63, and as the Y-shaft 71 is rotated forward and backward by a Y-motor 69, the hand table 63 is moved in a direction toward the magazine 52 and in a direction away from the magazine 52.

In the table 63, a pair of hands 64, 64 having supporting shafts 67 as their respective pivot points are mounted. Each hand has its rear end side pulled by a plunger 65 and its part near the distal end is tensioned by a spring 66 from the hand table 63. Therefore, during a period when the plungers 65 are off, both hands 64 are energized by the springs 66 and thus closed as shown in FIG. 20. When the plungers 65 are on to pull the rear rends of the hands, the hands 64 are in the state of FIG. 19, that is, both hands 64 are open against the energization by the springs 66.

When executing an operation to take out a given tape cassette 1 from the magazine 52, first, as the Z-shaft 54 is driven, the hand unit 60 is moved to a position at the height of the housing part 52a in which the target tape cassette 1 is housed. Then, both hands 64 are opened by the plungers 65 as shown in FIG. 19, and in this state, the hand table 63 is moved by the Y-motor 69 into the direction toward the magazine 52. When the hand table 63 is moved to the state of FIG. 20, the plungers 65 are turned off at this point. Therefore, both hands 64 are energized by the springs 66 and thus moved in the closing direction. Thus, the hands 64, 64 are engaged with the recess parts 7 provided on both lateral sides of the tape cassette 1 so as to grasp the tape cassette 1, as shown in FIG. 20. As the hand unit 60 in this state is moved by the Y-motor 69 into the direction away from the magazine 52, the tape cassette 1 is taken out. The tape cassette 1 thus taken out is carried by the hand unit 60 to a predetermined tape streamer drive 10, the port 56, or another housing part 52a of the magazine. When housing the tape cassette 1 into the magazine 52, the above-described operation in the reverse order is carried out.

As described above, the remote memory chip 4 is provided in side the tape cassette 1. The library device 50 can access the remote memory chip 4, similarly to the tape streamer drive 10. Therefore, a remote memory drive box 70 is arranged on the hand table 63 as shown in FIGS. 19, 20 and 21, and a circuit unit as the remote memory interface 32 is embedded in the remote memory drive box 70. The structure of the remote memory interface 32 will be described later. At a position on the back side of the tape cassette 1 facing the position where the remote memory chip 4 is arranged, the antenna 33 is provided.

Figure 20:
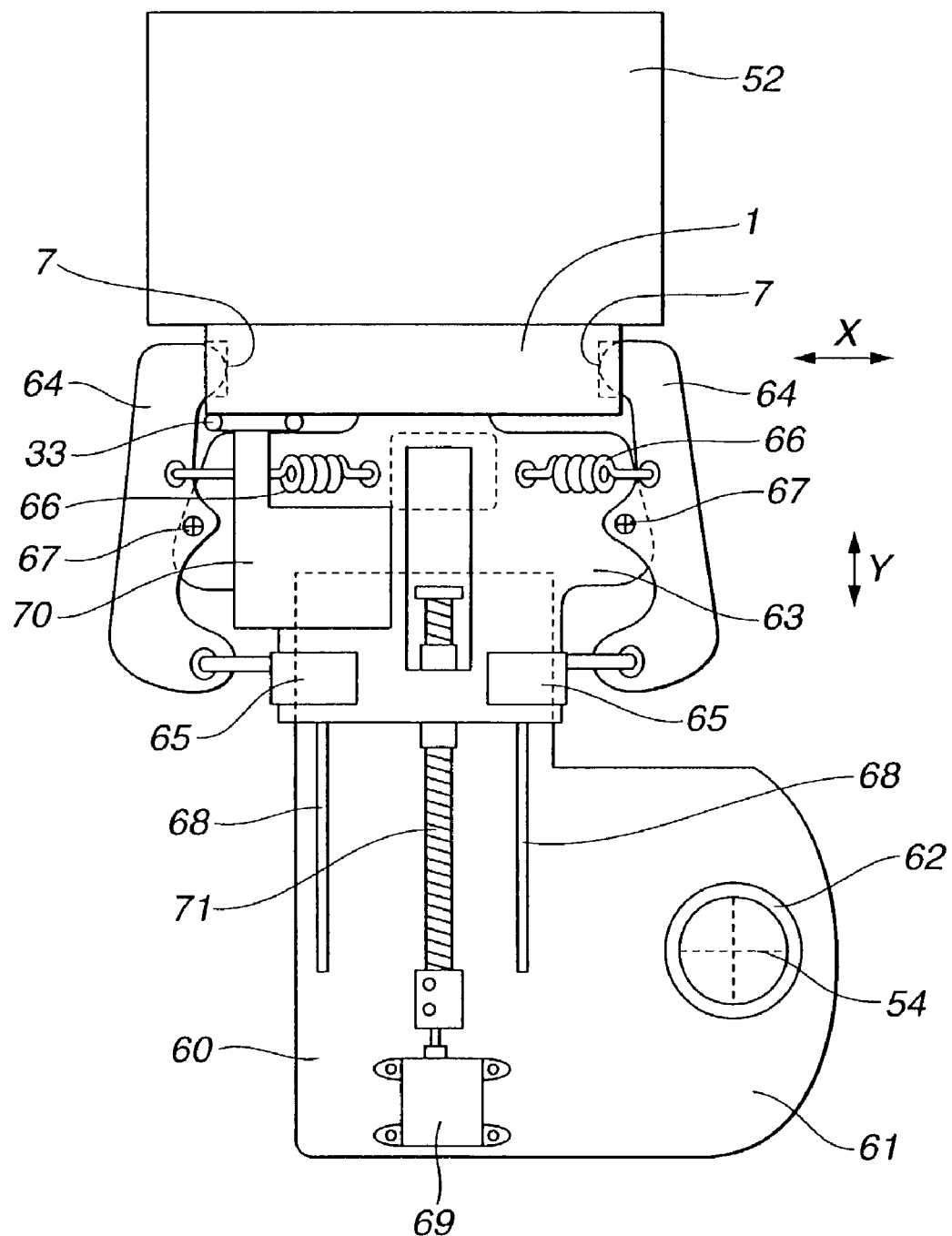
FIG. 20 is a plan view showing the operating state of the hand unit constituting the library device.

For example, in the state of FIG. 20, the antenna 33 and the remote memory chip 4 in the tape cassette 1 are very close to each other. In this state, the remote memory chip 4 can be accessed by radio communication. On the other hand, in the state of FIG. 19, the antenna 33 and the remote memory chip 4 are away from each other approximately at a distance e. However, if the distance e is approximately several centimeters, the remote memory chip 4 can be accessed.

Figure 21:
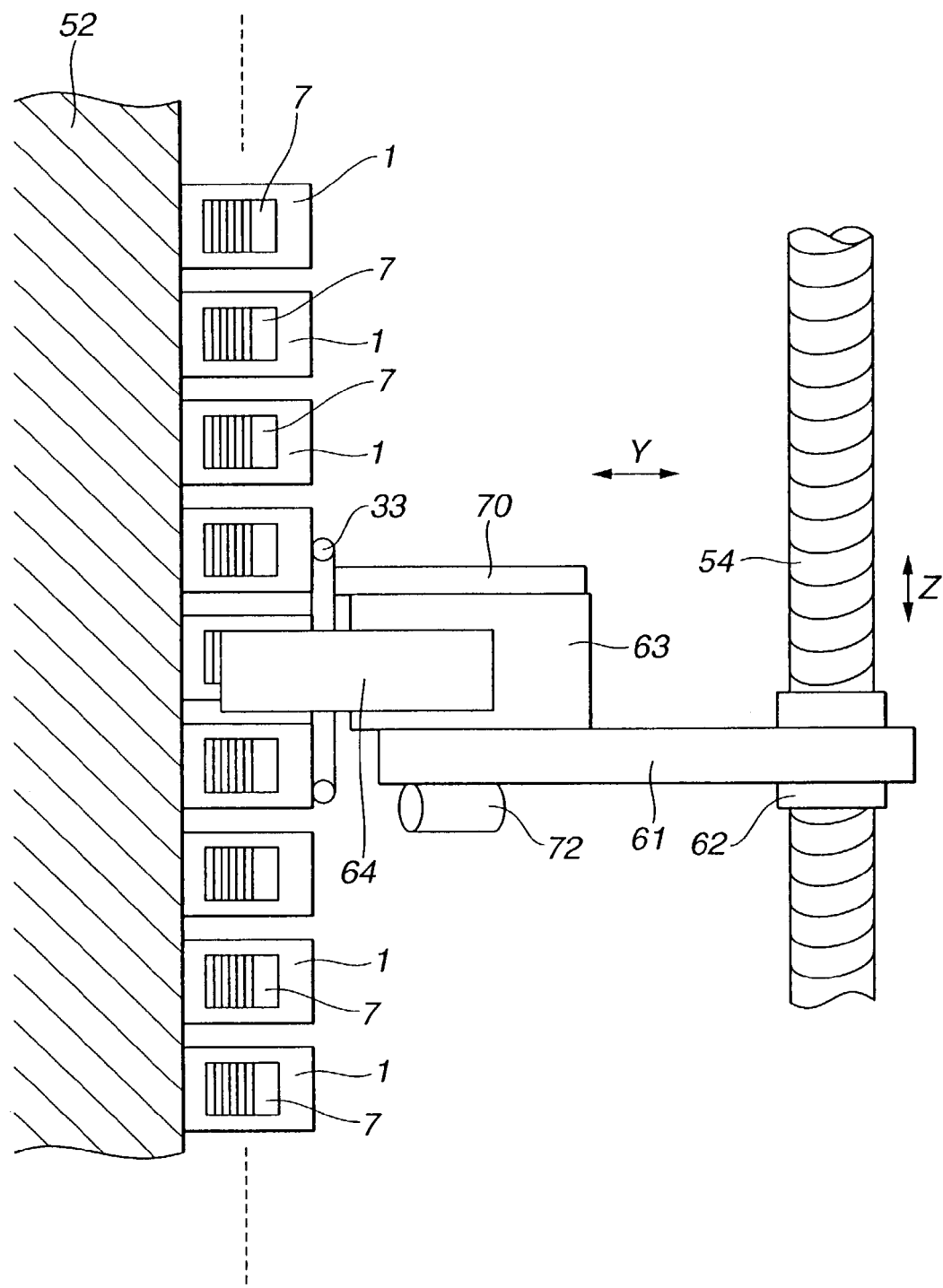
FIG. 21 is a side view showing the hand unit of the library device.

In FIGS. 19, 20 and 21, a bar code reader 72 is provided below the stand 61. Since the bar code reader 72 is thus provided, for example, if the tape cassette 1 with a bar code label attached thereto is housed, its bar code information can be read. In the case where the bar code reader 72 is provided, the relation between the position where the bar code reader 72 is arranged and the position where the antenna 33 is arranged is not particularly limited. For example, the bar code reader 72 may be arranged on the hand table.

Figure 22:
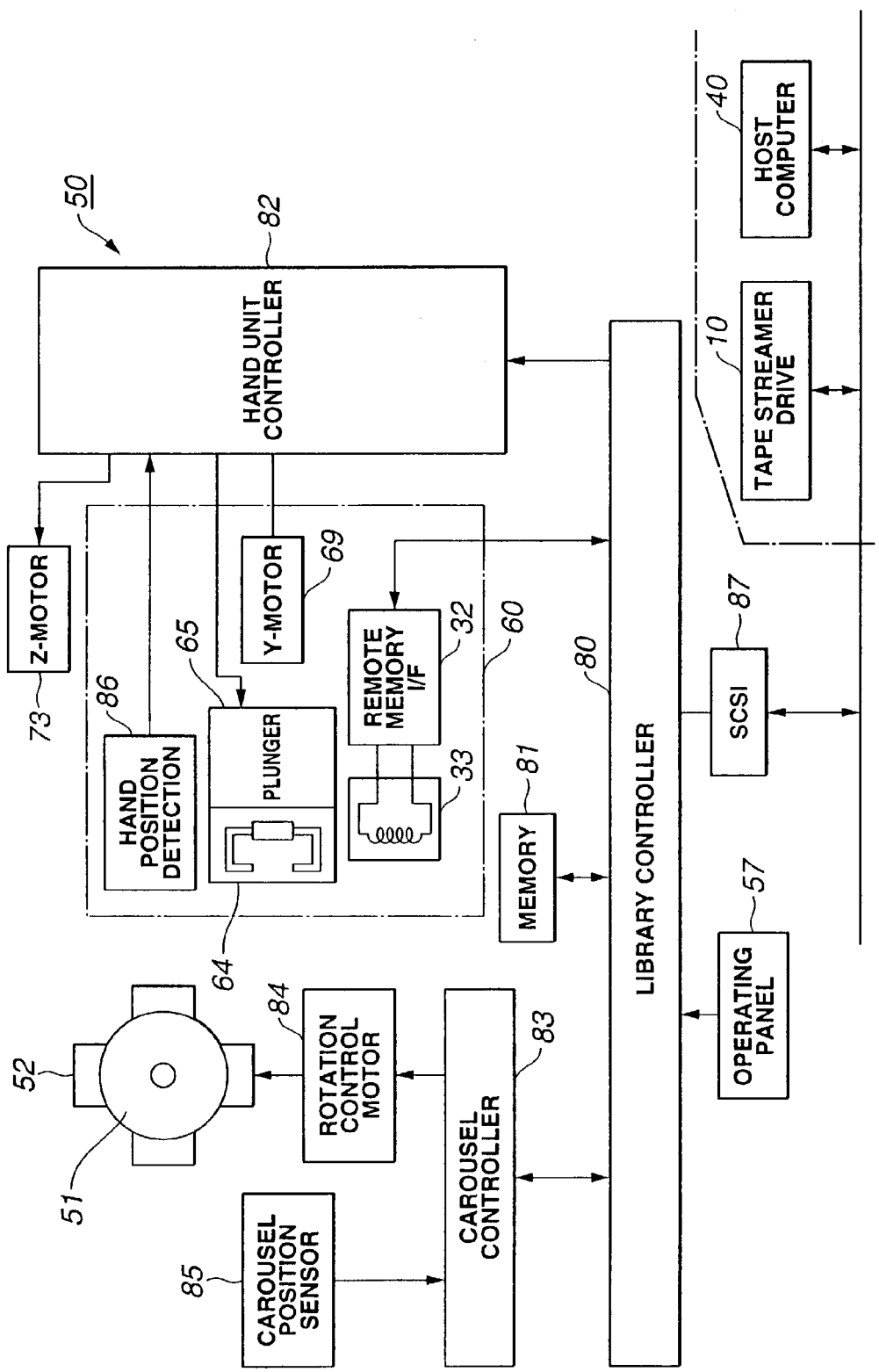
FIG. 22 is a block diagram showing the library device.

The internal structure of the library device 50 having the above-described mechanism is shown in FIG. 22.

The library controller 80 is a unit for controlling the entire library device 50. The library controller 80 can communicate with the tape streamer drive 10 and the host computer 40 via a SCSI interface 87.

Therefore, the library controller 80 executes transport of the tape cassette 1 to and from the magazine 52, the tape streamer drive 10 and the port 56, and management of the housed tape cassette 1 (for example, access to the remote memory chip 4 in the tape cassette 1) in accordance with SCSI commands from the host computer 40.

A memory 81 is a work memory used for processing by the library controller 80. As described above, operation information from the operating panel 57 is supplied to the library controller 80, and the library controller 80 executes necessary operation control corresponding to the operation.

A carousel controller 83 drives a rotation control motor 84 in accordance with an instruction from the library controller 80, thus carrying out an operation to rotate the carousel 51. That is, an operation to select the magazine 52 to face the hand unit 60 is carried out. A carousel position sensor 85 detects the rotating position of the carousel 51, that is, which magazine 52 is selected. In this case, the hand unit 60 faces the magazine 52. As the carousel controller 83 rotationally drives the carousel 51 while taking in information from the carousel position sensor 85, the target magazine 52 is selected. A hand unit controller 82 drives the hand unit 60 in accordance with an instruction from the library controller 80.

Specifically, the hand unit controller 82 drives the Z-motor 73 to move the hand unit 60 in the Z-direction. In this case, since the position of the hand unit 60 in the Z-direction is detected by the hand position detection unit 86, the hand unit controller 82 drives the Z-motor 73 while confirming position detection information from the hand position detection unit 86, thereby positioning the hand unit 60 at a predetermined height designated by the library controller 80. The hand unit controller 82 drives the Y-motor 69 and the plungers 65 at predetermined timing, respectively, thus carrying out operations to take out and house the tape cassette 1 by using the hands 64 as described above.

As described above, the circuit unit as the remote memory interface 32 is housed in the remote memory drive box 70 provided in the hand unit 60. The structure of the remote memory interface 32 will be described later with reference to FIG. 23. In principle, it has the structure shown in FIG. 3, similarly to the remote memory interface 30 in the tape streamer drive 10 described above with reference to FIG. 15. The remote memory interface 32 is connected to the library controller 80. Therefore, via this remote memory interface 32, the library controller 80 can issues a command to the tape cassette 1 in the magazine 52 which is close to the antenna 33, or the remote memory chip 4 in the tape cassette 1 held by the hand unit 60, thus carrying out write/read access. In this case, too, the access is achieved by a command from the library controller 80 and an acknowledgment from the remote memory chip 4.

In the case where the bar code reader 72 is provided as described above, though not shown, a driving circuit system of the bar code reader 72 is provided and the read information is supplied to the library controller 80.

The structure and operation of the remote memory interface 32 installed in the above-described library device 50 will now be described.

Figure 23:
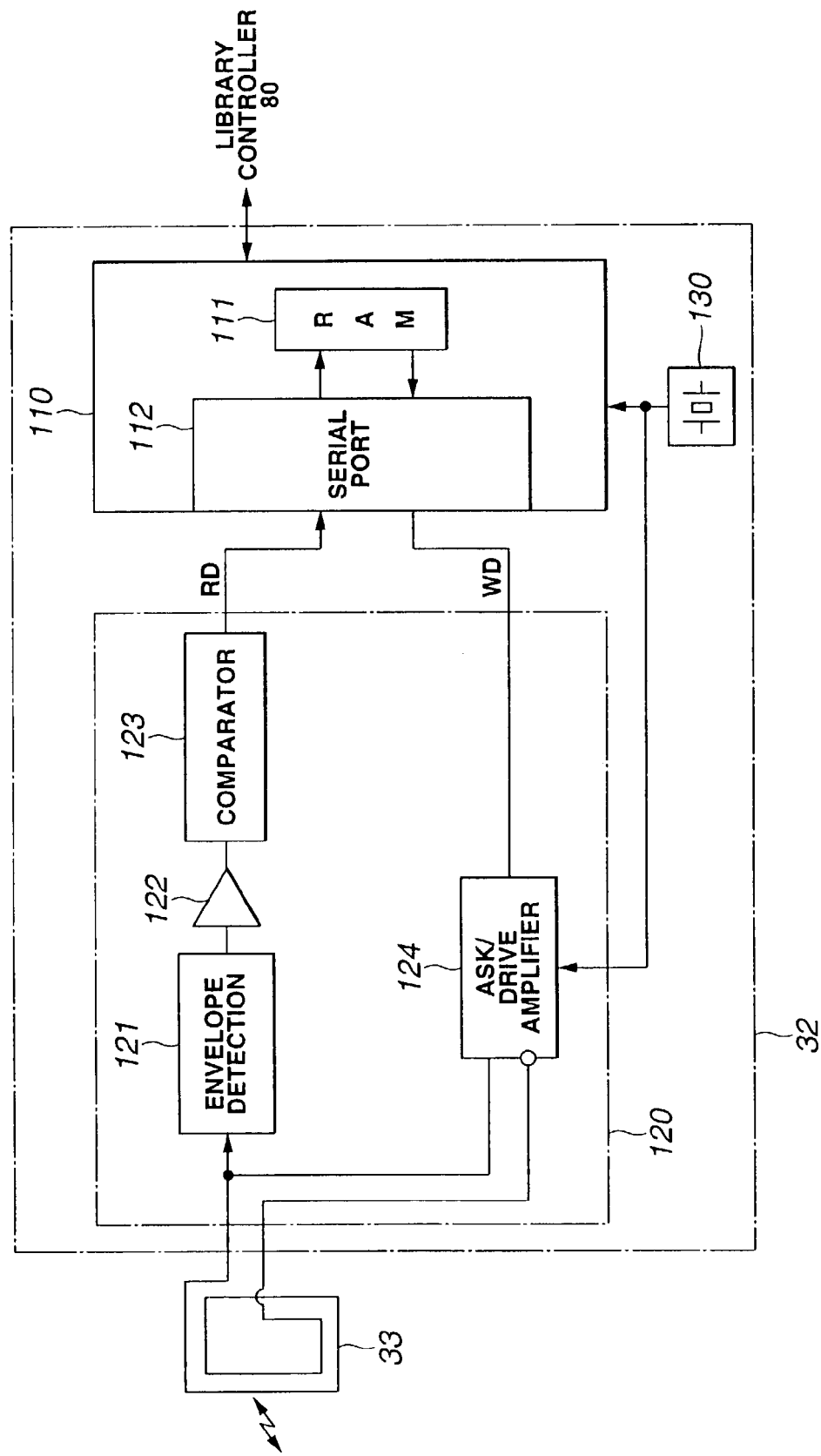
FIG. 23 is a block diagram showing a remote memory interface.

FIG. 23 shows the structure of the remote memory interface 32.

This remote memory interface 32 has a CPU 110 as a general-purpose microcomputer, an RF unit 120, and a clock generator 130 made up of a crystal oscillator. The RF unit 120 is made up of an analog-based circuit and carries out transmission from the antenna 33 and data reception from the remote memory chip 4. The processing for encoding transmission data and decoding reception data is carried out by software control at the CPU 110. An ASK/drive amplifier 124 is provided as a transmission system in the RF unit 120, and at the time of transmission, transmission data WD is supplied from the CPU 1120. An envelope detection unit 121, an amplifier 122 and a comparator 123 are provided as a receiving system in the RF unit 120.

A RAM 111 of the CPU 110, shown in FIG. 23, is a so-called built-in microcomputer RAM, for example, having a capacity of 4 kbytes. In short, it is a RAM having a capacity of an ordinary RAM installed in a general-purpose microcomputer. A serial port 112 is also shown. Although the built-in RAM is used in this example, the RAM may be an external memory chip connected to the CPU 110. The CPU 110 carries out an operation to execute communication access to the remote memory chip 4 in accordance with instructions such as commands from the library controller 80. Specifically, in response to requests from the library controller 80, the CPU 110 carries out processing to encode (generate) transmission data to be sent to the remote memory chip 4, processing to decode reception data from the remote memory chip 4, and processing to transmit read-out data decoded as reception data and an acknowledgment from the remote memory chip 4 to the library controller 80.

An operating clock of the CPU 110 is supplied from the clock generator 130. The clock generator 130 outputs a clock of, for example, 13.56 MHZ. Therefore, the operating clock frequency of the CPU 110 is 13.56 MHZ. As described above, the carrier frequency for the communication between the remote memory chip 4 and the remote memory interface 32 is 13.56 MHZ. Therefore, the clock of 13.56 MHZ from the clock generator 130 is used as it is as the carrier frequency in the ASK/drive amplifier 124. In the CPU 110, for example, a clock of 13.56×n (MHZ), obtained by multiplying the clock of 13.56 MHZ from the clock generator 130 by n, may be used as the operating clock. In any case, in the embodiment, the operating clock frequency of the CPU 110 may be a frequency generated from the clock frequency from the clock generator 130, that is, a frequency generated from a clock, which is a common base of the clock frequency and the carrier frequency. For example, while the clock of 13.56 MHZ is outputted from the clock generator 130 in this embodiment, the operating clock frequency of the CPU 110 may be an x-multiple or 1/x-multiple of 13.56 MHZ and a frequency divider or multiplier may be incorporated in any way. The multiplication and frequency division may be carried out by using a non-integer value.

The transmission/reception operation in such a remote memory interface 32 will be described hereinafter.

At the time of transmission, that is, when command data to be sent to the remote memory chip 4 is supplied from the library controller 80, the CPU 110 prefixes a preamble and sync to the command data and also postfixes CRC. That is, encoding of data having the data structure shown in FIG. 7 is carried out. The transmission data is Manchester-coded as described with reference to FIG. 8. Then, the transmission data having the Manchester-coded data structure of FIG. 7 is stored into the RAM 111, and the stored transmission data WD is outputted to the RF unit 120 at a transmission rate which is twice 106 kbps from the serial port 112. In the RF unit 120, the ASK/drive amplifier 124 ASK-modulates the carrier of 13.56 MHZ by using the transmission data WD, as described with reference to FIG. 5. The modulated wave is transmitted from the antenna 33 to the remote memory chip 4.

At the time of reception, transmission data from the remote memory chip 4 is detected by the RF unit 120 as information based on an impedance change, as described above. In th RF unit 120, the envelope detection unit 121 carries out envelope detection as shown in FIG. 6A with respect to the modulated wave described with reference to FIG. 5. The comparator 123 binarizes data as shown in FIG. 6B, thus acquiring reception data as shown in FIG. 6C. Such reception data RD is inputted to the CPU 110 from the serial port 112. The CPU 110 performs octuple oversampling on the inputted reception data stream for a predetermined period and the stores the data to the RAM 111. The predetermined period may be a fixed period. For example, a period of 9.67 ms is enough. Therefore, the storage capacity necessary as the RAM 111 is 1 kbyte, and the above-described RAM having a capacity of 4 kbytes suffices, which is typically installed in the CPU. With respect to the reception data stored in the RAM 111, decision of an optimum sampling phase, preamble detection, sync detection and the like are carried out, and processing to take out data returned from the remote memory chip 4 is carries out. CRC checking is carried out, too. Packet data from the remote memory chip 4, obtained by such decoding processing, is transmitted to the library controller 80.

6. State Transition of Remote Memory Chip

The above-described library device 50 and the above-described tape streamer drive 10 can access the remote memory chip 4 in the tape cassette 1. As described above, when the remote memory chip 4 is accessed, its receiving electromagnetic field generates a power supply to turn the power on.

Figure 24:
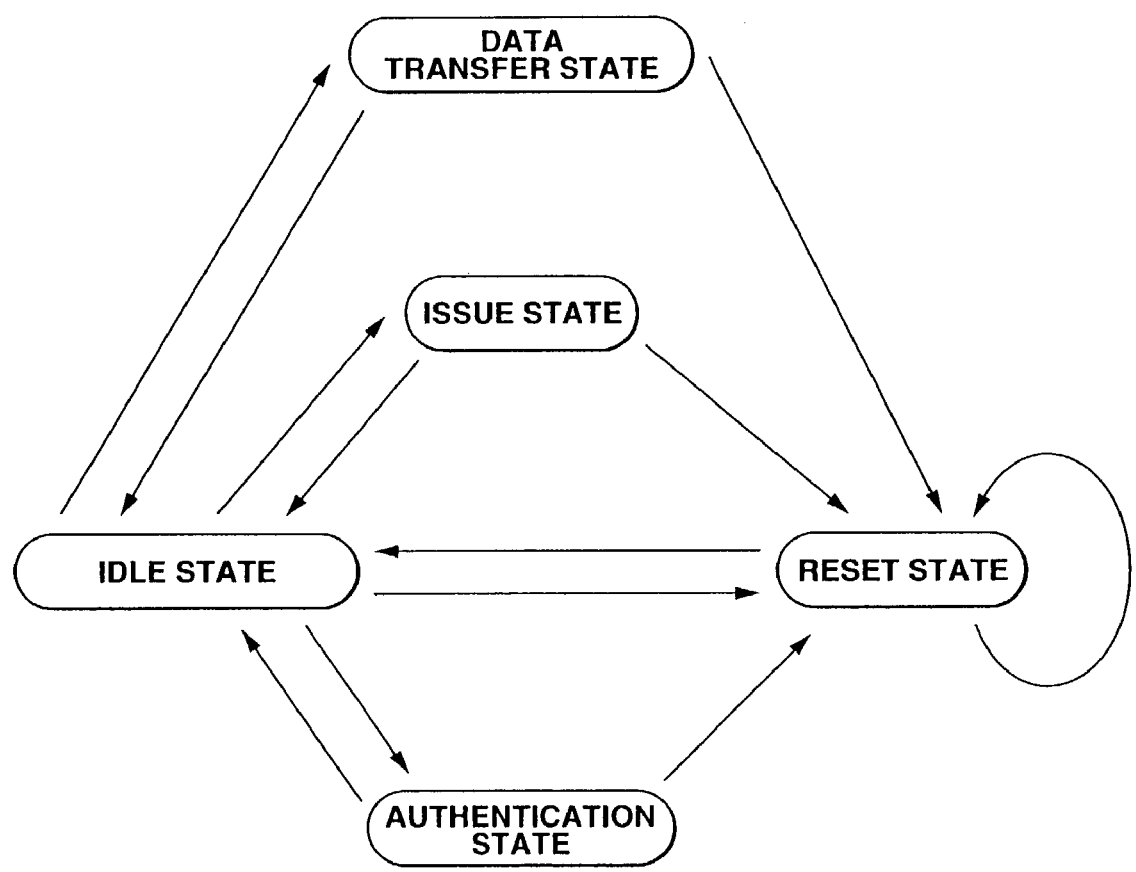
FIG. 24 is a view for explaining state transition of the remote memory chip.

The logical state transition inside the remote memory chip 4 is shown in FIG. 24.

As shown in FIG. 24, transitions between five logical modes, that is, a reset state, an idle state, an issue state, an authentication state, and a data transfer state, are made as indicated by arrows. Each of the states will be described.

The reset state refers to a state in which the remote memory chip 4 is supplied with power and is stable. That is, when an access to the remote memory chip 4 occurs, the remote memory chip 4 enters the reset state.

The idle state is a state to be reached as the remote memory chip 4 completes internal reset. In this idle state, the remote memory chip 4 is on standby for accepting any command.

The data transfer state refers to a state in which the remote memory chip 4 is executing a command from the data transfer system. As will be described later in detail, a command packet as a data transfer command from the library device 50 is supposed to include a session identifier, and a packet including no session identifier will be invalidated.

The issue state is a special state in which writing to a read-only area of the remote memory chip 4 can be carried out. This read-only area is equivalent to the area defined by the write protect top address of the manufacture part shown in FIG. 10 and the write protected count. This relates to the write and read operations carried out only on the manufacturer side, such as writing of the serial number, the logical format and the like. This issue state is reached in accordance with a dedicated command.

The authentication state is a state in which processing to specify the remote memory chip 4 in accordance with the serial number or the like and to provide a session identifier for the specified remote memory chip 4 is carried out.

The processing in which the library device 50 carries out authentication, provides a session identifier and stores the session identifier to the EEP-ROM 4d in the remote memory chip 4 will be described later as session identifier allocation processing.

7. Commands to Remote Memory Chip

The communication with the remote memory chip 4 is established by a command and an acknowledgment corresponding to the command, as described above. A certain command and an acknowledgment corresponding to the command have different codes. This is for preventing inconvenience in the case where, for example, the library controller 80 issues a command to a specified tape cassette 1 of the many tape cassettes 1 housed in parallel in the magazine 52. For example, when the remote memory chip 4 in the specified tape cassette 1 which received a command returns an acknowledgment corresponding thereto, if the command and the acknowledgment corresponding thereto have the same code, the remote memory chip of the adjacent tape cassette 1 might receive it as a command. Such a failure is to be prevented.

Moreover, for example, the library controller 80 uses session identifiers in order to communicate only with the remote memory chip 4 of a specified tape cassette, of the many tape cassettes 1 housed adjacently to each other. In this case, the library controller 80 gives a session identifier as a 1-byte code to the remote memory chip 4 of each tape cassette by session identification allocation processing, which will be described later. After the session identifier is given, the session identifier is included in the command, thus enabling recognition of the command to the remote memory chip 4 in the specified tape cassette.

By using the serial number or the like stored in advance in the remote memory chip 4, that is, by including the serial number into the command packet, the command to the specified remote memory chip 4 can be recognized without using the session identifier. However, the code proper to each cassette tape such as the serial number has a long data length of, for example, 32 bytes. Including such long identification information into the command packet is disadvantageous to transmission efficiency and device structure. Therefore, the system using the 1-byte session identifier as in this example is very effective as a command transmission system. FIG. 25 shows a list of commands (requests) to the remote memory chip 4 from the device side, that is, the library device 50 or the tape streamer drive 10, and acknowledgments from the remote memory chip 4 corresponding to the respective commands.

Data transmitted as the respective commands and acknowledgments shown in FIG. 25 will be described with reference to FIGS. 26 to 33. The "device side" in the description refers to the library controller 80 of the library device 50 or the system controller 15 of the tape streamer drive 10.

In FIGS. 26 to 33, data is sectioned by 1 byte each (1box represents 1 bytes), and data of 5 bytes or 21 bytes is shown. That is, the length of 1 byte and the data part of 4 or 20 bytes are shown as the transmission/reception data structure shown in FIG. 7.

[ATN REQ/ATN ACK]

A command for instructing the remote memory chip 4 to shift to or confirm the idle state and to load data to the register 4e is ATN REQ (attention command), and an acknowledgment for informing that the remote memory chip 4 which received the command is in the idle state is ATN ACK.

The data structures of these command and acknowledgment are shown in FIGS. 26A and 26B.

FIG. 26A shows an ATN REQ command. As data of 4 bytes following the length (LEN) of 1 byte, an operation code (OPE), a lower block number (BKL), a higher block number (BKH), and "0" are arranged. The acknowledgment corresponding to this command is ATN ACK shown in FIG. 26B. As data of 4 bytes following the length (LEN) of 1 byte, an operation code (OPE), an error status (STS), a mode register (MDR), and a register value (I/A) are arranged.

As described with reference to FIG. 7, the length (LEN) represents the data length of the subsequent command data or acknowledgment data. Specifically, it represents either 4 bytes or 20 bytes. The operation code (OPE) is a code of the command or acknowledgement. In the case of FIG. 26A, the operation code (OPE) is a 1-byte code as the ATN REQ command. In the case of FIG. 26B, the operation code (OPE) is a 1-byte code as ATN ACK. The lower block number (BKL) and the higher block number (BKH) have values designating block addresses in the EEP-ROM 4d. The error status (STS) has a value indicating an error status of the operation corresponding to the command. The mode register (MDR) has a value indicating a mode status. The register value (I/A) has a value which is loaded in the register 4e. Since the session identifier stored in the scratch pad memory of the EEP-ROM 4d or a successive session identifier in the authentication process is loaded in the register 4e, its value is arranged therein.

Not only in ATN REQ shown in FIG. 26A but also in the respective commands, which will be described hereinafter, the length (LEN) is basically followed by an operation code (OPE), a lower block number (BKL), and a higher block number (BKH), each consisting of 1 byte. Moreover, not only in ATN ACK shown in FIG. 26B but also in the respective acknowledgments, which will be described hereinafter, the length (LEN) is basically followed by an operation code (OPE), an error status (STS), a mode register (MDR), and a register value (I/A), each consisting of 1 byte.

In the respective commands shown in FIGS. 26A to 33A, basically, the fifth byte is used as a session identifier. In ATN REQ of FIG. 26A, the fifth byte where a session identifier is arranged is basically set as "0". Thus, ATN REQ is a command to an unspecified remote memory chip 4. This is because the ATN REQ command is to be issued by the library controller 80 to an unspecified tape cassette in the magazine 52 or the remote memory chip 4 in a tape cassette on which session identifier allocation has not performed.

The remote memory chip 4 which received ATN REQ enters the idle state and loads the session identifier stored in the scratch pad memory into the register 4e. Therefore, in ATN ACK, the register value I/A of the fifth byte shown in FIG. 26B includes the value of the session identifier (SID) loaded in the register 4d. If session identifier allocation has not yet performed on the remote memory chip 4, the session identifier stored in the scratch pad memory is "0x00" and therefore the value included in ATN ACK as the register value (I/A) is "0x00".

[STS REQ/STS ACK]

A command for reporting the status to a specified remote memory chip 4 is STS REQ (status command), and an acknowledgment from the remote memory chip 4 corresponding to the command is STS ACK. In STS REQ, data of 4 bytes following the length (LEN) of 1 byte are constituted by an operation code (OPE) of STS REQ, block numbers (BKL) and (BKH), and a session identifier (SID) indicating the specified remote memory chip 4, each consisting of 1 byte, as shown in FIG. 27A. In STS ACK, data of 20 bytes following the length (LEN) of 1 byte are constituted by an operation code (OPE) of STS ACK, an error status (STS), a mode register (MDR), a register value (I/A) as the value of a session identifier, VER, a maximum block number low (MBL), a maximum block number high (MBH), each consisting of 1 byte, and a reserved area of 13 bytes, as shown in FIG. 27B. By these command and acknowledgment, the device side can cause the remote memory chip 4 to report the status of the remote memory chip 4.

[WR REQ/WR ACK]

Figure 28A:
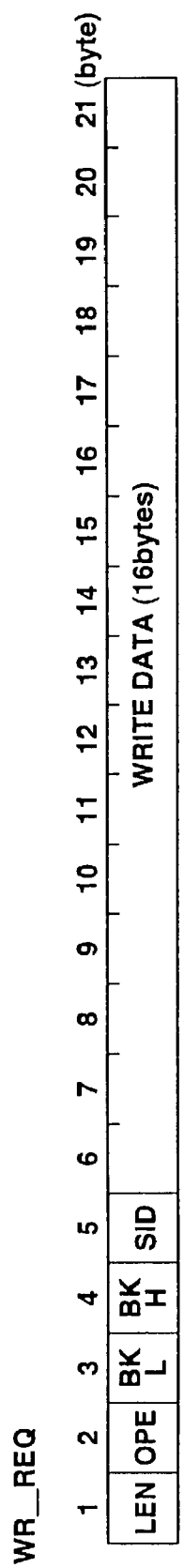
FIGS. 28A and 28B show packets related to a data writing request.
Figure 28B:
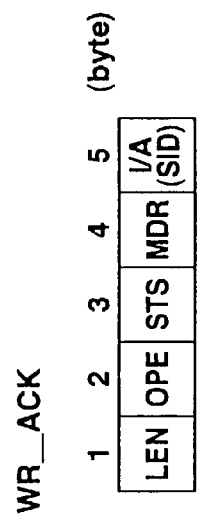

A command for instructing a specified remote memory chip 4 to write data is WR REQ (write command), and an acknowledgment from the remote memory chip 4 corresponding to the command is WR ACK. In WR REQ, data of 20 bytes following the length (LEN) of 1 byte are constituted by an operation code (OPE) of WR REQ, block numbers (BKL) and (BKH), a session identifier (SID), each consisting of 1 byte, and write data of 16 bytes, as shown in FIG. 28A. In WR ACK, data of 4 bytes following the length (LEN) of 1 byte are constituted by an operation code (OPE) of WR ACK, an error status (STS), a mode register (MDR), and a register value (I/A) as the value of a session identifier, each consisting of 1 byte, as shown in FIG. 28B. In accordance with these command and acknowledgment, the device side can designate the specific remote memory chip 4 by the session identifier, sends write address (block number) and write data thereto, and cause the data to be written into the EEP-ROM 4d of the remote memory chip 4.

[RD REQ/RD ACK]

Figure 29A:
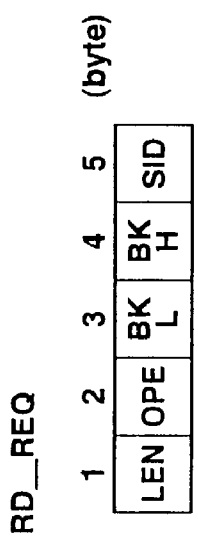
FIGS. 29A and 29B show packets related to a data reading request.
Figure 29B:
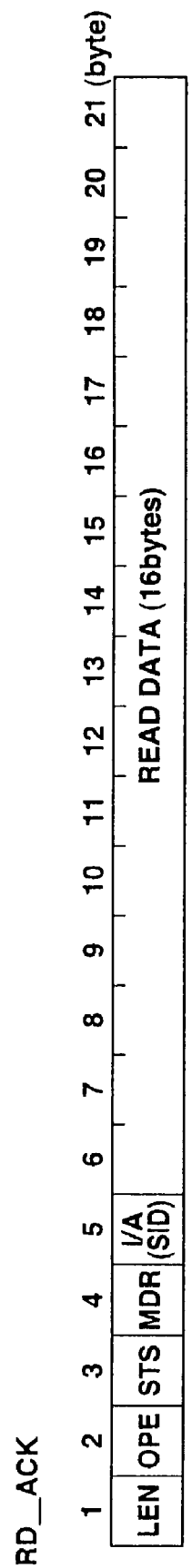

A command for instructing a specified remote memory chip 4 to read data is RD REQ (read command), and an acknowledgment from the remote memory chip 4 corresponding to the command is RD ACK. In RD REQ, data of 4 bytes following the length (LEN) of 1 byte are constituted by an operation code (OPE) of RD REQ, block numbers (BKL) and (BKH), and a session identifier (SID), each consisting of 1 byte, as shown in FIG. 29A. In RD ACK, data of 20 bytes following the length (LEN) of 1 byte are constituted by an operation code (OPE) of RD ACK, an error status (STS), a mode register (MDR), a register value (I/A) as the value of a session identifier, each consisting of 1 byte, and read data of 16 bytes, as shown in FIG. 29B. In accordance with these command and acknowledgment, the device side can designate the specific remote memory chip 4 and read address (block number) by the session identifier and cause predetermined data to be read out from the EEP-ROM 4d of the remote memory chip 4.

[DWN REQ/DWN ACK]

A command for instructing a specified remote memory chip 4 to end communication or to cancel the authentication state and shift to the reset state is DWN REQ (down command), and an acknowledgment from the remote memory chip 4 corresponding to the command is DWN ACK. In DWN REQ, data of 4 bytes following the length (LEN) of 1 byte are constituted by an operation code (OPE) of DWN REQ, block numbers (BKL) and (BKH), and a session identifier (SID), each consisting of 1 byte, as shown in FIG. 30A. In DWN ACK, data of 4 bytes following the length (LEN) of 1 byte are constituted by an operation code (OPE) of DWN ACK, an error status (STS), a mode register (MDR), and a register value (I/A) as the value of a session identifier, each consisting of 1 byte, as shown in FIG. 30B. In accordance with these command and acknowledgment, the device side can end the communication with the specific remote memory chip 4 or cancel the authentication state of the remote memory chip 4.

[ADM REQ/ADM ACK]

A command for instructing a specified remote memory chip 4 to shift to the issue state is ADM REQ (administration command), and an acknowledgment from the remote memory chip 4 corresponding to the command is ADM ACK. In ADM REQ, data of 20 bytes following the length (LEN) of 1 byte are constituted by an operation code (OPE) of ADM REQ, block numbers (BKL) and (BKH), a value "0", each consisting of 1 byte, and an ADM code of 16 bytes, as shown in FIG. 31A. In ADM ACK, data of 4 bytes following the length (LEN) of 1 byte are constituted by an operation code (OPE) of ADM ACK, an error status (STS), a mode register (MDR), and a register value (I/A) as the value of a session identifier, each consisting of 1 byte, as shown in FIG. 31B. In accordance with these command and acknowledgment, the device side can cause the remote memory chip 4 to shift to the issue state.

[WRP REQ/WRP ACK]

Figure 32A:
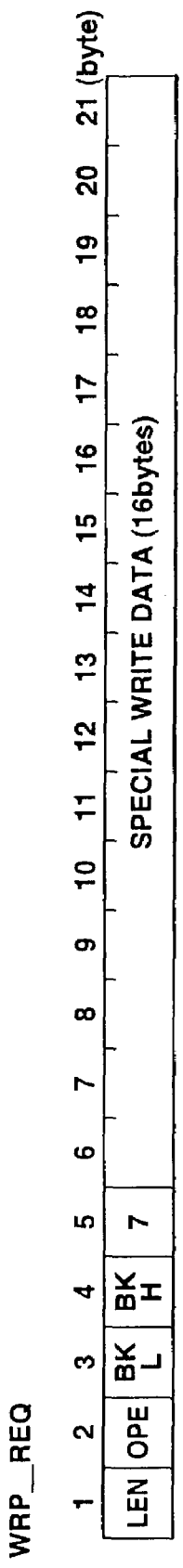
FIGS. 32A and 32B show packets related to a writing instruction in the issue state.
Figure 32B:
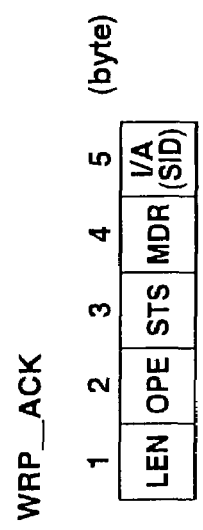

A command for instructing the remote memory chip 4 which has shifted to the issue state in accordance with the above-described ADM REQ command, to write data, is WRP REQ (special write command), and an acknowledgment from the remote memory chip 4 corresponding to the command is WRP ACK. In WRP REQ, data of 20 bytes following the length (LEN) of 1 byte are constituted by an operation code (OPE) of WRP REQ, block numbers (BKL) and (BKH), a value "7", each consisting of 1 byte, and special write data of 16 bytes, as shown in FIG. 32A. In WRP ACK, data of 4 bytes following the length (LEN) of 1 byte are constituted by an operation code (OPE) of WRP ACK, an error status (STS), a mode register (MDR), and a register value (I/A) as the value of a session identifier, each consisting of 1 byte, as shown in FIG. 32B. In accordance with these command and acknowledgment, the device side can send write address and write data to the remote memory chip 4 in the issue state and cause the data to be written into the EEP-ROM 4d of the remote memory chip 4. This is a write operation to an area where writing is usually not possible. For example, this is used for writing a serial number or logical formatting.

[CMP REQ/CMP ACK]

A command for instructing the remote memory chip 4 to compare data and carry out processing corresponding to the result of comparison in authentication processing, which will be described later, is CMP REQ (compare command), and an acknowledgment from the remote memory chip 4 corresponding to the command is CMP ACK. In CMP REQ, data of 20 bytes following the length (LEN) of 1 byte are constituted by an operation code (OPE) of CMP REQ, block numbers (BKL) and (BKH), a session identifier (SID), each consisting of 1 byte, and comparison data of 16 bytes, as shown in FIG. 33A. In CMP ACK, data of 4 bytes following the length (LEN) of 1 byte are constituted by an operation code (OPE) of CMP ACK, an error status (STS), a mode register (MDR), and a register value (I/A) as the value of a session identifier, each consisting of 1 byte, as shown in FIG. 33B. In accordance with these command and acknowledgment, the device side can cause the specific remote memory chip 4 to compare data at a specific address (block number) in the EEP-ROM 4d with the comparison data sent thereto. This enables collation of the serial number.

The commands and acknowledgments are described above. The library device 50 and the tape streamer drive 10 can made various accesses by outputting these commands to the remote memory chip 4 and receiving the acknowledgments through the remote memory interface 30.

8. Session Identifier Allocation Processing

Figure 34:
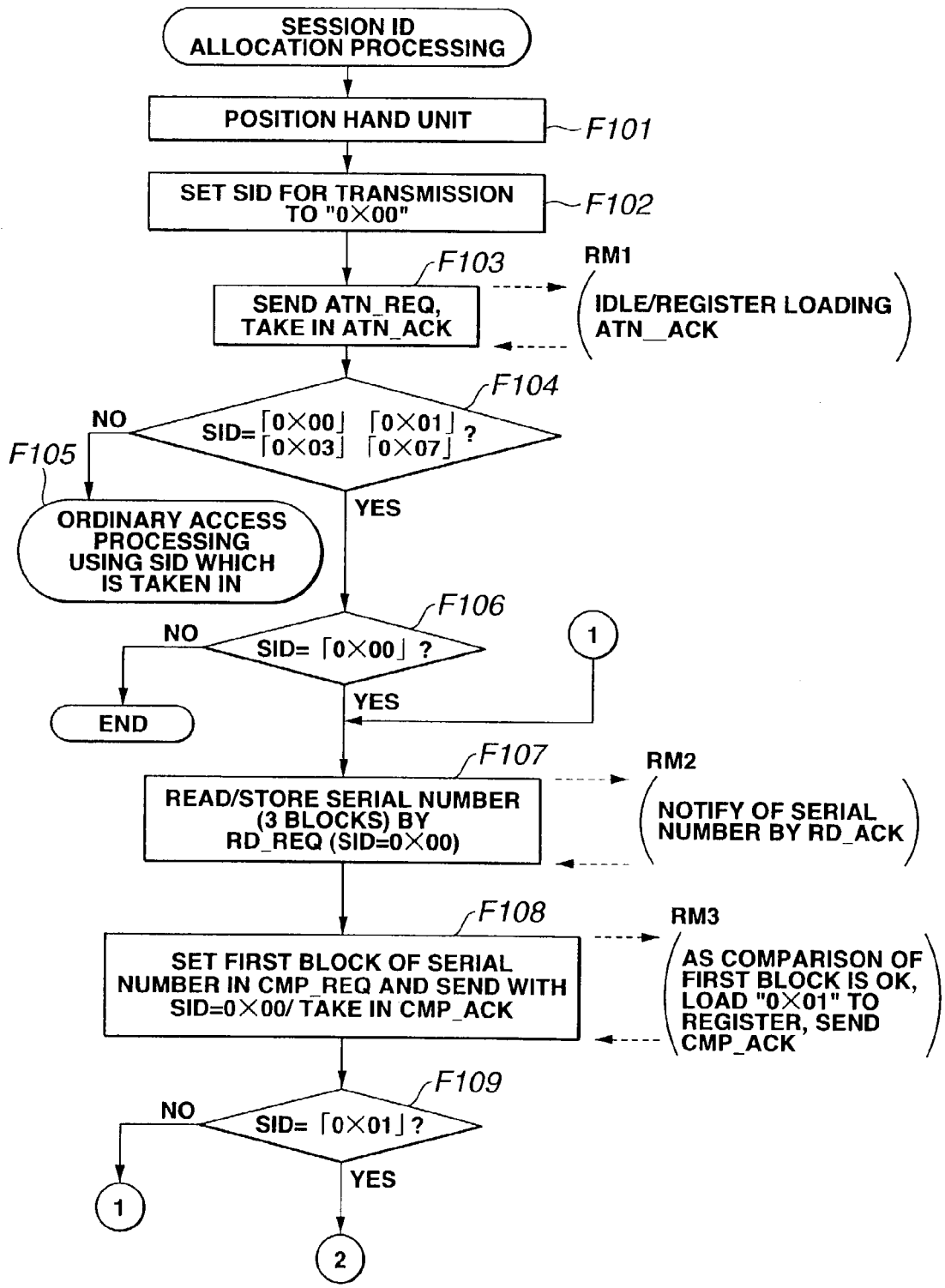
FIG. 34 is a flowchart showing session identifier allocation processing.
Figure 35:
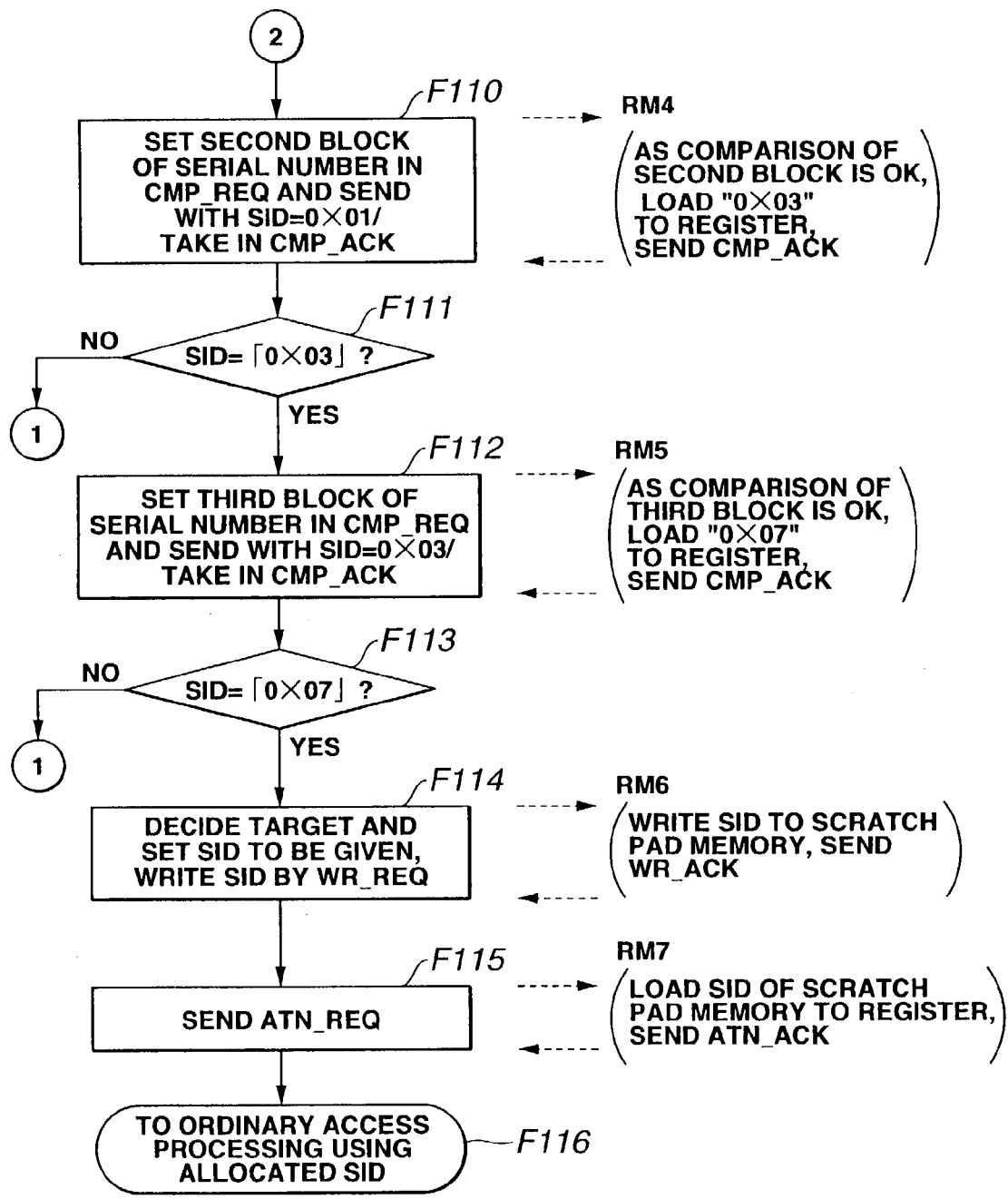
FIG. 35 is a flowchart showing the session identifier allocation processing.

As described above, the library controller 80 of the library device 50 uses a session identifier in order to communicate with only the remote memory chip 4 of a specified tape cassette of the many tape cassettes 1 housed adjacently in the magazine 52. To do this, each tape cassette 1 must be authenticated and a session identifier must be allocated thereto. The session identifier allocation processing will be described with reference to FIGS. 34 and 35. FIGS. 34 and 35 are flowcharts of the authentication and session identifier allocation processing, executed by the library controller 80 to the remote memory chip 4 within a certain tape cassette 1 via the remote memory interface 30.

In the flowcharts of FIGS. 34 and 35, the processing by the library controller 80 is represented by steps F101 to F116 and the operations on the side of the remote memory chip 4 corresponding to commands sent from the remote memory interface 32 in accordance with the processing by the library controller 80 are represented by processing RM1 to RM7.

Step F101 represents positioning processing for the hand unit 60 with respect to the tape cassette 1 to which a session identifier is to be given. That is, it is the processing to control the Z-motor 73 to shift the hand unit 60 to a position of the height where the target tape cassette 1 is housed. Of course, rotational operation control of the carousel 51 is carried out when necessary.

As the hand unit 60 is positioned at the position facing the target tape cassette 1, the library controller 80 at step F102 sets a session identifier value used for sending a command to "0x00", that is, the value of the free state. For example, it is set in an internal register of the library controller 80. Next, at step F103, the library controller 80 sends an attention command ATN REQ to the remote memory chip 4 of the tape cassette 1. Specifically, the library controller 80 sends transmission data of the structure shown in FIG. 7 including the data shown in FIG. 26A from the remote memory interface 32. Then, the library controller 80 takes in ATN ACK as a response from the remote memory chip 4 corresponding to the command.

On the other hand, as processing RM1 to receive the ATN REQ command, the remote memory chip 4 enters an idle state and loads the session identifier value stored in the scratch pad memory at this point, to the register 4e. Then, the remote memory chip 4 sends ATN ACK of the structure of FIG. 7 including the data of FIG. 26B, as an acknowledgment. In this case, the session identifier value loaded to the register 4e, that is, the session identifier value stored in the scratch pad memory at that point, is included as the register value (I/A) of ATN ACK.

ATN ACK is decoded by the remote memory interface 32 and taken into the library controller 80. The library controller 80 at step F104 discriminates the session identifier value notified of as the register value (I/A). In this case, the library controller 80 confirms whether the session identifier value is "0x00", "0x01", "0x03" or "0x07". If the session identifier value of the remote memory chip 4 at that point is other than "0x00", "0x01", "0x03" and "0x07", that is, one of "0x 02", "0x04", "0x06", "0x08" to "0xfe", the remote memory chip 4 has already been authenticated and a session identifier has already been allocated thereto. Therefore, the authentication and session identifier allocation in this case are not necessary and the processing goes to step F105. With respect to the remote memory chip 4, the library controller 80 can shift to ordinary access processing (which will be described with reference to FIG. 36) using the session identifier taken from ATN ACK. Since the above-described session identifier value "0xff" is obtained only when the tape cassette is loaded in the tape streamer drive, the value "0xff" is not obtained at step F104 in this case.

In the case where there is another device having the function to allocate a session identifier to the remote memory chip 4, for example, in the case where the system structure includes a plurality of library devices 50, or an automatic loader for the tape cassette exists, the session identifier may be allocated by another device when the processing goes to step F105. Normally, when the tape cassette 1 is brought under the control of another device, access from the library device 50 to the tape cassette 1 under the control of another device may be avoided by performing release processing of FIG. 37 (by resetting the session identifier value to "0x00" for release), which will be described later. However, depending on the system structure, the tape cassette 1 under the control of another device might be accessed by the library device 50. The phrase "under the control" refers to the state where the tape cassette has been authenticated and a session identifier has been allocated thereto.

In the case where access from the library device 50 to the tape cassette 1 under the control of another device is possible, it may be considered to, for example, inhibit access or enable only read-access when the processing goes to step F105. Of course, if the allocation of session identifiers is clarified (there is no duplicate session identifier) between the plurality of library devices 50 and integrated control is performed in the system, ordinary access including write-access may be enabled. In short, suitable processing may be performed in accordance with the actual system structure. In this example, however, in order not to complicate the explanation, it is assumed that a session identifier has already been allocated by the library controller 80, when the processing goes to step F105.

If it is determined at step F104 that the session identifier taken from ATN ACK is one of "0x00", "0x01", "0x03" and "0x07", the processing goes to step F106 and whether or not the session identifier is "0x00" is confirmed. "0x01", "0x03" and "0x07" are successive session identifiers used in the authentication processing, and at this point, the session identifier is normally none of "0x01", "0x03" and "0x07". If the session identifier is one of these, there is a high possibility that the authentication processing by another device is being carried out. Therefore, the processing is ended at step F106. In short, the authentication and session identifier allocation processing in this case are stopped.

If the session identifier is "0x00", the authentication and session identifier allocation processing will be carried out.

First, at step F107, the library controller 80 sends a read command RD REQ of FIG. 29A to request for the serial number. In response to this, the remote memory chip 4 reads out and sends its serial number in an acknowledgment RD ACK, as processing RM2. The library controller 80 stores into the internal register the serial number of the remote memory chip 4 decoded from the acknowledgment RD ACK. In this case, the session identifier (SID) of the read command RD REQ sent from the remote memory interface 32 has the value set at step F102, that is, "0x00". The serial number in this case has a total of 48 bytes including the cartridge serial number of 32 bytes and the cartridge serial number CRC of 16 bytes, as described with reference to FIG. 12. On the other hand, 16-byte data can be inserted into the acknowledgment RD ACK corresponding to the read command RD REQ, as shown in FIG. 29B. Therefore, the data of the serial number is divided 16 bytes each into the first to third blocks as described with reference to FIG. 12, and the serial number is read out by using three read commands. Specifically, a first read command RD REQ designates a storage block for the cartridge serial number high shown in FIG. 12 in the EEP-ROM 4d as the block number, thus reading out the higher 16-byte value of the cartridge serial number. Next, a second read command RD REQ designates a storage block for the cartridge serial number low as the block number, thus reading out the lower 16-byte value of the cartridge serial number. Finally, a third read command RD REQ designates a storage block for the cartridge serial number CRC as the block number, thus reading out the 16-byte value of the cartridge serial number CRC. The library controller 80 stores the serial number of 48 bytes taken from the acknowledgments corresponding to these three commands.

Subsequently, the library controller 80 at step F108 sets the first block of the serial number stored at step F107 as comparison data in a compare command CMP REQ of FIG. 33A and sends the compare command CMP REQ from the remote memory interface 32. In this case, the block number of the compare command CMP REQ designates the block in which the cartridge serial number high is stored in the EEP-ROM 4d. The session identifier (SID) remains to be "0x00" at this point. In response to this, as processing RM3, the remote memory chip 4 compares the 16 bytes of the cartridge serial number high stored in the EEP-ROM 4d with the 16 bytes of the first block supplied as the comparison data and confirms whether these are coincident or not. If these are coincident, the remote memory chip 4 sets the value of the register 4e to a successive session identifier "0x01" and sends an acknowledgment CMP ACK of FIG. 33B. Therefore, the register value (I/A) in the acknowledgment CMP ACK is "0x01". The library controller 80 takes in the decoded data of the acknowledgment CMP ACK. In this case, if the session identifier sent as the register value (I/A) is "0x01", it is considered that the authentication of the first stage has been completed, and the processing goes from step F109 to step F110 of FIG. 35.

However, if the session identifier sent as the register value (I/A) is not "0x01" at this point (if it remains to be "0x00" or is another value), or if an error is notified of by the error status (STS) of the acknowledgment CMP ACK, it is considered that the authentication of the first stage has an error, and the processing returns to step F107 to redo the authentication processing.

The case where the register value (I/A) of the acknowledgment CMP ACK is "0x00" is when the first block of the serial number is not coincident on the remote memory chip 4. As the cause of this, it may be considered that the communication at step F107 and the communication at step F108 were carried out with respect to different tape cassettes 1 because of interference or the like, or a data error in the communication may be considered. Also in the case where the register value is "0x02" or any subsequent value, it is considered that the communication at step F107 and the communication at step F108 were carried out with respect to different tape cassettes 1. Therefore, as satisfactory communication with the remote memory chip of the specified tape cassette 1 is not secured, an authentication error is generated.

If the processing goes to step F110 of FIG. 35 on the assumption that the authentication of the first stage has been completed, the library controller 80 sets the second block of the serial number stored at step F107 as comparison data in a compare command CMP REQ and sends the compare command CMP REQ from the remote memory interface 32. In this case, the block number of the compare command CMP REQ designates the block in which the cartridge serial number low is stored in the EEP-ROM 4d. Since the session identifier stored in the internal register of the library controller 80 is updated to "0x01" at the time when the authentication of the first stage is completed, the session identifier (SID) of the compare command CMP REQ at this point is "0x01". In response to this, as processing RM4, the remote memory chip 4 compares the 16 bytes of the cartridge serial number low stored in the EEP-ROM 4d with the 16 bytes of the second block supplied as the comparison data and confirms whether these are coincident or not. If these are coincident, the remote memory chip 4 sets the value of the register 4e to a successive session identifier "0x03" and sends an acknowledgment CMP ACK. Therefore, the register value (I/A) in the acknowledgment CMP ACK is "0x03". The library controller 80 takes in the decoded data of the acknowledgment CMP ACK. In this case, if the session identifier sent as the register value (I/A) is "0x03", it is considered that the authentication of the second stage has been completed, and the processing goes from step F111 to step F112.

However, if the session identifier sent as the register value (I/A) is not "0x03" at this point, or if an error is notified of by the error status (STS), it is considered that the authentication of the second stage has an error, and the processing returns to step F107 to redo the authentication processing.

If the processing goes to step F112 on the assumption that the authentication of the second stage has been completed, the library controller 80 sets the third block of the serial number stored at step F107 as comparison data in a compare command CMP REQ and sends the compare command CMP REQ from the remote memory interface 32. In this case, the block number of the compare command CMP REQ designates the block in which the cartridge serial number CRC is stored in the EEP-ROM 4d. Since the session identifier stored in the internal register of the library controller 80 is updated to "0x03" at the time when the authentication of the second stage is completed, the session identifier (SID) of the compare command CMP REQ at this point is "0x03".

In response to this, as processing RM5, the remote memory chip 4 compares the 16 bytes of the cartridge serial number CRC stored in the EEP-ROM 4d with the 16 bytes of the third block supplied as the comparison data and confirms whether these are coincident or not. If these are coincident, the remote memory chip 4 sets the value of the register 4e to a successive session identifier "0x07" and sends an acknowledgment CMP ACK. Therefore, the register value (I/A) in the acknowledgment CMP ACK is "0x07".

The library controller 80 takes in the decoded data of the acknowledgment CMP ACK. In this case, if the session identifier sent as the register value (I/A) is "0x07", it is considered that the authentication of the third stage has been completed, and the processing goes from step F113 to step F114. However, if the session identifier sent as the register value (I/A) is not "0x07" at this point, or if an error is notified of by the error status (STS), it is considered that the authentication of the third stage has an error, and the processing returns to step F107 to redo the authentication processing.

As the authentication of the third stage is completed, the library controller 80 at step F114 assumes that the remote memory chip 4 of the tape cassette 1 could be specified in accordance with the serial number and decided as a communication target. A session identifier which has no duplicate is set for this specified remote memory chip 4. That is, one of the values "0x02", "0x04", "0x06", "0x08" to "0xfe" is selected and set. The library controller 80 manages the session identifier thus set, in association with the serial number.

After the session identifier to be given is set, the library controller 80 sets the session identifier set in a write command WR REQ of FIG. 28A, as write data, and sends the write command WR REQ from the remote memory interface 32. In this case, the block number of the write command WR REQ designates the block (see FIG. 12) of the session identifier of the scratch pad in the EEP-ROM 4d. Since the session identifier stored in the internal register of the library controller 80 is updated to "0x07" at the time when the authentication of the third stage is completed, the session identifier (SID) of the write command WR REQ at this point is "0x07". In response to this, as processing RM6, the remote memory chip 4 writes the value of the session identifier supplied as the write data into the scratch pad memory of the EEP-ROM 4d. Then, the remote memory chip 4 sends an acknowledgment WR ACK. Since the value of the register 4e at this points remains to be the value of the successive session identifier "0x07", the register value (I/A) in the acknowledgment WR ACK is "0x07". The library controller 80 takes in the acknowledgment WR ACK, thus confirming that the preset session identifier has been written correctly in the remote memory chip 4.

Although not shown in the flowchart, if the register value (I/A) in the acknowledgment WR ACK is not "0x07" at this point, or if an error is notified of by the error status (STS), it is considered that a write error is generated, and required processing to re-try writing or the like is carried out.

After the writing of the session identifier to the remote memory chip 4 is completed, the library controller 80 at step F115 sends an attention command ATN REQ from the remote memory interface 32.

When the attention command ATN REQ is sent to the remote memory chip 4 as described above, the remote memory chip 4 loads the session identifier stored in the scratch pad memory, to the register 4e. Therefore, in this case, as processing RM7, the session identifier written by the processing RM6, that is, the value of the session identifier allocated this time, is loaded to the register 4e, and the register value (I/A) in an acknowledgment ATN ACK is the value of the allocated session identifier.

The library controller 80 confirms the value of the session identifier allocated this time in the acknowledgment ATN ACK, thus confirming the normal state.

Then, at step F116, with respect to the remote memory chip 4 which has been authenticated as the target and to which the session identifier has been allocated, ordinary access using the session identifier allocated this time is made possible from then on.

In this embodiment, the authentication of the remote memory chip 4 and the provision of the session identifier thereto are carried out as described above. As the long serial number of, for example, 48 bytes, stored in the remote memory chip 4 is confirmed by communications of a plurality of stages, the remote memory chip 4 can be authenticated securely. Particularly, since success in the authentication requires stable communication for a plurality of times, the reliability of the authentication is improved. By using the successive session identifiers, a plurality of communications for authentication can be accurately carried out. Moreover, as the successive session identifiers are used, it can be recognized, for example, that the remote memory chip 4 is being authenticated by another device, and such inconvenience as duplicate authentication processing can be avoided. As a result of the reliable authentication, the library controller 80 allocates a session identifier to the remote memory chip 4 of the tape cassette 1 in the magazine 52 and thus contains the session identifier in its commands from then on. Thus, desired access processing to a specified remote memory chip 4 can be securely carried out using only a session identifier of 1 byte, without using the long serial number of, for example, 48 bytes.

9. Data Transfer Processing

Examples of access processing using a session identifier (write access/read access) will now be described with reference to FIGS. 36A and 36B.

Figure 36A:
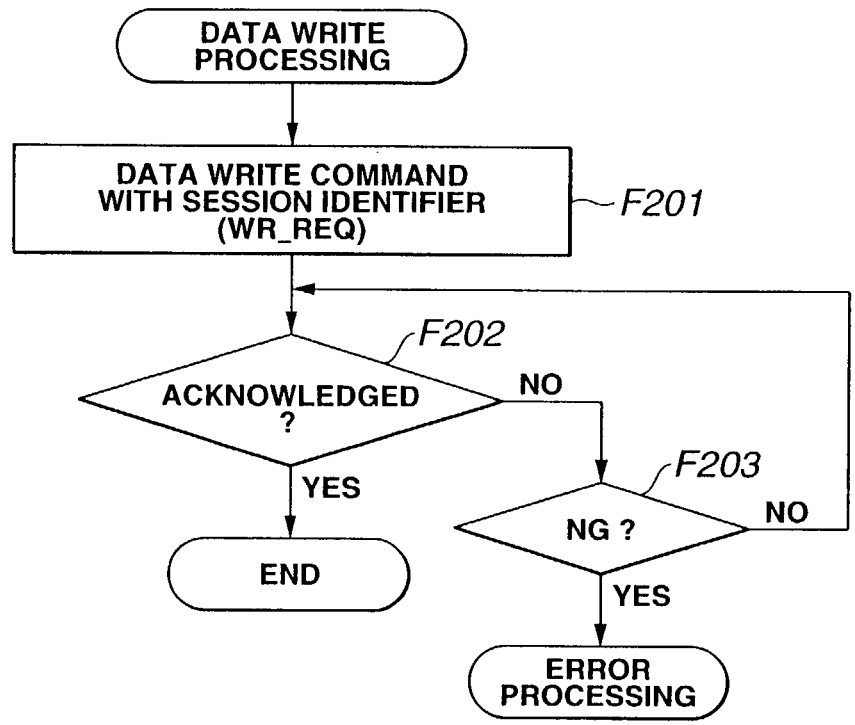
FIGS. 36A and 36B are flowcharts showing data transfer processing.

FIG. 36A shows the case of carrying out data writing to the EEP-ROM 4d of a specified remote memory chip 4. In this processing, as a matter of course, the hand unit 60 is positioned at the height of the target tape cassette 1 and is enabled to communicate with its remote memory chip 4. In this case, at step F201, a command for data writing is outputted to the remote memory chip 4. Specifically, a write command WR REQ specifying the remote memory chip 4 by the session identifier (SID) and including the block number for writing and write data is sent, and the remote memory chip 4 is caused to carry out data writing.

In accordance with the write operation, the remote memory chip 4 sends back an acknowledgment WR ACK. The library controller 80 confirms the appropriate acknowledgment WR ACK and then ends the processing step at F202. If the library controller 80 could not receive the acknowledgment properly, a write error is generated at step F203. In this case, for example, the position of the hand unit 60 may be adjusted for re-trying.

Figure 36B:
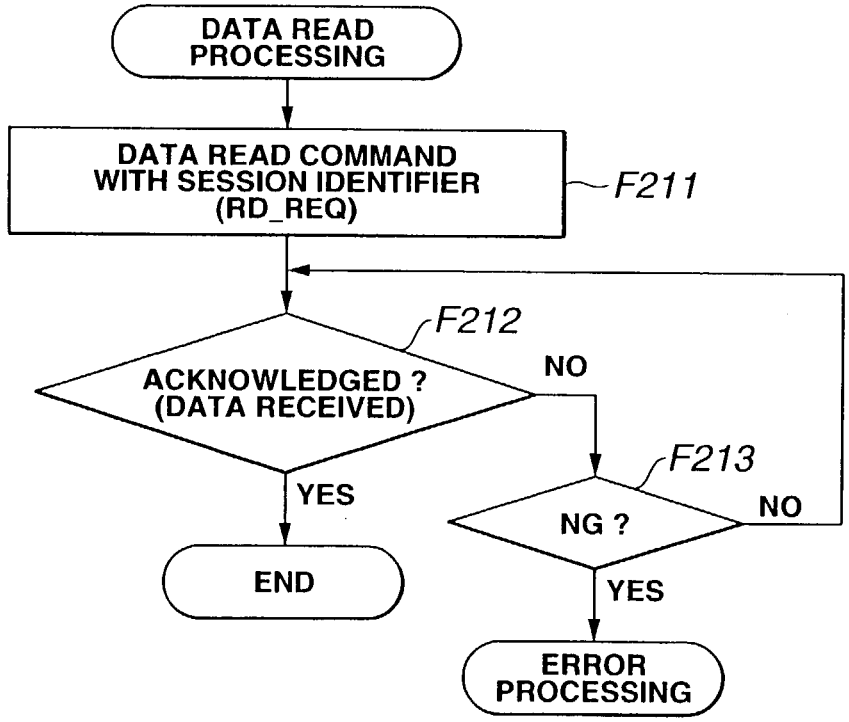

FIG. 36B shows the case of requesting data reading from the EEP-ROM 4d of a specified remote memory chip 4. Again, in this processing, the hand unit 60 is positioned at the height of the target tape cassette 1. IN this case, at step F211, a data read command is outputted to the remote memory chip 4. Specifically, a read command RD REQ specifying the remote memory chip 4 by the session identifier (SID) and including the block number for reading is sent, and the remote memory chip 4 is caused to carry out data reading. The remote memory chip 4 sends back an acknowledgment RD ACK in accordance with the read operation. This enables the library controller 80 to receive read data. That is, the library controller 80 confirms the appropriate acknowledgment and takes in the data, and then end the processing at step F212. If the library controller 80 could not receive the acknowledgment properly, a read error is generated at step F213. In this case, for example, the position of the hand unit 60 may be adjusted for re-trying.

By thus using the session identifier in the write operation to and the read operation from the remote memory chip 4, secure data transfer to and from the target remote memory chip 4 can be realized without causing interference, and the data size of the command/acknowledgment need not be increased.

10. Processing in Releasing Cassette

After authenticating a certain remote memory chip 4 and giving a session identifier, the library controller 80 accesses the remote memory chip 4 by using the session identifier as described above. When releasing the tape cassette 1 which was given the session identifier and put under the control of the library controller 80, the library controller 80 carries out processing of FIG. 37.

Figure 37:
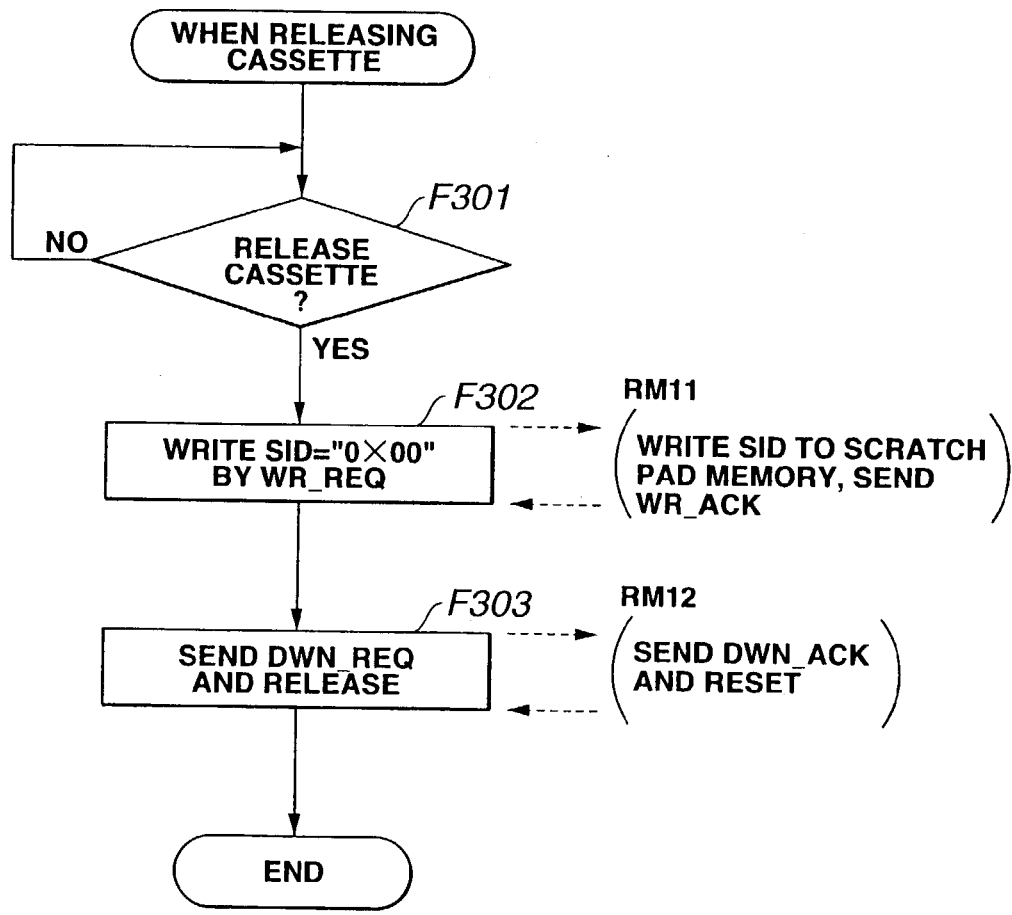
FIG. 37 is a flowchart showing processing at the time of releasing the cassette.

In FIG. 37, the processing by the library controller 80 is represented by steps F301 to F303 and processing by the remote memory chip 4 corresponding thereto is represented by processing RM11, RM12.

Specifically, when the cassette needs to be released, the processing by the library controller 80 goes from step F301 to step F302 in FIG. 37. The library controller 80 sets a free-state session identifier "0x00" as write data in a write command WR REQ and sends the write command WR REQ from the remote memory interface 32. In this case, the block number of the write command WR REQ designates a block for the session identifier in the scratch pad memory in the EEP-ROM 4d (see FIG. 12). As a matter of course, the session identifier (SID) of the write command WR REQ is caused to have the value of the session identifier set for the remote memory chip 4 of the tape cassette 1 which is to be released, thus specifying the communication target. In response to this, as processing RM11, the remote memory chip 4 writes the value of the session identifier supplied as the write data, that is, "0x00", into the area of the scratch pad memory in the EEP-ROM 4d. Then, the remote memory chip 4 sends an acknowledgment WR ACK.

After taking in the acknowledgment WR ACK and confirming that the session identifier "0x00" was written in the remote memory chip 4, the library controller 80 at step F303 sends a down command DWN REQ of FIG. 30 from the remote memory interface 32. Even at this point, the session identifier (SID) of the down command DWN REQ has the value of the session identifier set for the tape cassette 1 which is to be released. At this point, the session identifier has the value of "0x00" on the scratch pad memory, because the value of the session identifier which has been set until then is loaded to the register 4e and the remote memory chip 4 as the target of the down command DWN REQ is specified by that session identifier. In response to the down command DWN REQ, as processing RM12, the remote memory chip 4 sends an acknowledgment DWN ACK and enters a reset state. Thus, this remote memory chip 4 loses the session identifier given by the library controller 80 and is released from the control of the library controller 80. As the remote memory chip 4 is released, when the tape cassette 1 is loaded, for example, in another library device 50 or the like, it is properly authenticated by this library device 50 and is given a session identifier so that access can be executed without causing any disturbance in the system.

11. Various Modifications

The embodiment of the present invention is described above. However, this invention is not limited to the structures and operations described above with reference to the drawings. The data stored in the tape cassette, the tape streamer drive and the remote memory chip, the structures of the library device and the tape streamer drive, the structure of the remote memory interface, the communication system with the remote memory chip, and the procedures of the transmission processing/reception processing can be suitably changed in accordance with the actual conditions of use. Of course, the non-volatile memory in the remote memory chip is not limited to the EEP-ROM.

Also the authentication and session identifier allocation processing shown in FIGS. 34 and 35 are not limited to the above-described procedures.

While the authentication processing is carried out through communications of three stages in the above description, communications of two stages or four or more stages may be carried out. The definition of the session identifier values in FIG. 14 such as the successive session identifiers "0x01", "0x03", "0x07" is just an example.

Moreover, the commands and acknowledgments are not limited to those shown in FIG. 25.

The authentication and session identifier allocation processing shown in FIGS. 34 and 34, the data transfer processing using the session identifier shown in FIG. 36, and the processing in releasing the cassette shown in FIG. 37 are described above as the processing carried out by the library controller 80. However, such processing may be similarly applied to the system controller 15 in the tape streamer drive 10 of FIG. 15.

As described above, in the tape streamer drive 10, if a session identifier has already been given to the tape cassette 1 loaded thereon, the session identifier is used as it is, and if not, a session identifier "0xff" is allocated.

Therefore, for example, when the tape cassette 1 which is given a session identifier by the library device 50 is loaded, the processing by the system controller 15 goes to step F105 of FIG. 34 and carries out the access processing of FIG. 36 by using that session identifier.

On the other hand, if a session identifier has not yet given to the loaded tape cassette 1 ("0x00"), the processing of steps F107 to F115 shown in FIGS. 34 and 35 is carried out for authentication and provision of a session identifier "0xff". After that, the access processing of FIG. 36 may be carried out by using the session identifier "0xff".

When ejecting the tape cassette 1 from the tape streamer drive 10, the processing of FIG. 37 is carried out. In this case, the processing of step F301 is to determine whether or not the tape cassette 1 to be ejected is given a session identifier "0xff" and thus put under the control of the system controller 15. For example, if the tape cassette 1 uses a session identifier given by the library device 50, it is originally not under the control of the system controller 15 and therefore the processing of FIG. 37 is not carried out. Only if the system controller 15 has given a session identifier "0xff", at the time of ejecting the cassette, the processing to reset the session identifier to "0x00" to release the cassette is carried out.

The above-described processing by the library device 50 is also applied to an automatic loader or reader/writer device. The automatic loader is a device which uses a magazine having a plurality of tape cassette 1 housed therein and enables continuous rotation (automatic replacement) of a plurality of tape cassettes 1 between the magazine and the tape streamer drive 10. The reader/writer device is a device which can mutually communicate with the remote memory chip 4 of the tape cassette 1 through radio communication as the user holds the tape cassette 1 in his/her hand and brings it close to the device. In these devices, too, reliable communication can be performed by carrying out the above-described authentication and provision of a session identifier.

The above description is related to the communication device (remote memory interface) provided in the tape streamer drive or the library device 50 supporting a tape cassette with a non-volatile memory to which recording and reproduction of digital signals are carried out. However, this invention is not limited this communication device and can also be applied to, for example, a recording and/or reproducing system capable of recording and/or reproducing information of video signals and audio signals, as digital signals.

INDUSTRIAL APPLICABILITY

As described above, according to the present invention, the recording medium supportable device such as the library device 50 authenticates each recording medium by identification information (for example, serial number) and controls it by a command based on radio communication. In this case, as a communication identifier (session identifier) corresponding to the identification number is set and given and the communication identifier is included in a command at the time of executing control, only a specified recording medium to be controlled carries out an operation corresponding to the command. Thus, the target recording medium can be properly controlled, and reading of data from memory means in the recording medium and writing of data to the memory means can be accurately carried out. Therefore, various advanced controls of the recording medium having non-contact memory means can be realized. By using short data of approximately 1 byte as the communication identifier, the quantity of communicated data is reduced and the efficiency of the communication is improved.

When authenticating a recording medium, the identification information (unique information such as serial number) of the recording medium is confirmed through reliable communication using successive communication identifiers, and reliable authentication is carried out through communications of several stages. Thus, a plurality of communications necessary for confirming long data of the serial number or the like may be securely carried out respectively. Moreover, since continuous stability of communication is a condition of authentication, a plurality of communications enables proper authentication.

As successive communication identifiers are given to recording media, whether or not a certain recording medium is being authenticated can be discriminated and appropriate processing corresponding to the status is made possible. For example, when a recording medium is being authenticated by another recording medium supportable device, it is possible to stop the authentication processing. In other words, a recording medium which is being authenticated by a certain recording medium supportable device can be prevented from being accessed by another recording medium supportable device. Thus, inconvenience due to duplicate access by various equipments can be prevented.

The communication carried out between the recording medium supportable device and the recording medium can be securely carried out in accordance with a command from the recording medium supportable device and an acknowledgment from the recording medium corresponding to the command. Particularly, if the command and the acknowledgment corresponding to the command are constituted by different codes, for example, the acknowledgment from the recording medium will not be erroneously recognized as a command to another recording medium, and execution of an inappropriate operation can be prevented.

When the recording medium supportable device such as the library device 50 releases the recording medium, the communication identifier given to the memory means is reset to the initial value. Thus, ordinary authentication of the recording medium can be carried out by another recording medium supportable device and the recording medium can be accessed. That is, occurrence of inconvenience in the case where the recording medium is sent and received between various recording medium supportable devices can be prevented.

What is claimed is:

1. A recording medium controlling method which is carried out by a recording medium supportable device having interface means capable of, with respect to a recording medium having memory means for storing identification information proper to the recording medium and communication means for executing non-contact data transfer with respect to the memory means, non-contact data transfer to/from the memory means by enabling execution of radio communication to/from the communication means, the method comprising:

an authentication step of sequentially communicating with the recording medium by using successive communication identifiers, thus confirming the identification information stored in the memory means of the recording medium and authenticating the recording medium;

a communication identifier provision step of setting a communication identifier for the recording medium authenticated at the authentication step and providing the communication identifier for the memory means of the recording medium; and a control step of specifying the recording medium by a command including the communication identifier and carrying out operation control of the memory means of the recording medium, wherein at the authentication step, the identification information is confirmed by n stages of communication using first to n-th successive communication identifiers, and wherein the communication identifier provided for the memory means further comprises a communication identifier reset step of resetting to an initial value at the communication identifier provision step.

2. The recording medium controlling method as claimed in claim 1, wherein at the control step, the recording medium is specified by a write or read command including the communication identifier and data transfer is carried out as data writing to or data reading from the memory means of the recording medium.

3. The recording medium controlling method as claimed in claim 1, wherein the communication carried out between the recording medium supportable device and the recording medium at the authentication step, the communication identifier provision step and the control step is executed in accordance with a command from the recording medium supportable device and an acknowledgment from the recording medium in response to the command.

4. A recording medium supportable device which supports a recording medium having memory means for storing identification information proper to the recording medium and communication means for carrying out non-contact data transfer with respect to the memory means, the device comprising:

interface means capable of carrying out non-contact data transfer to/from the memory means by executing radio communication to/from the communication means;

authentication means for causing the interface means to execute communication with the recording medium by using successive communication identifiers, thus confirming the identification information stored in the memory means of the recording medium and authenticating the recording medium;

communication identifier setting means for setting a communication identifier for the recording medium authenticated by the authentication means and causing the interface means to write the communication identifier to the memory means of the recording medium;

control means for specifying the recording medium by causing the interface means to output a command including the communication identifier, and carrying out operation control of the memory means of the recording medium; and communication identifier reset means for causing the interface means to output a command for resetting the communication identifier to an initial value, thus resetting to the initial value the communication identifier written in the memory means by the communication identifier setting means, wherein the authentication means confirms the identification information by causing execution of n stages of communication between the interface means and the recording medium using first to n-th successive communication identifiers.

5. The recording medium supportable device as claimed in claim 4, wherein the control means specifies the recording medium by causing the interface means to output a write or read command including the communication identifier and causes execution of data transfer as data writing to or data reading from the memory means of the recording medium.

6. The recording medium supportable device as claimed in claim 4, wherein the communication carried out between the interface means and the recording medium is executed in accordance with a command from the interface means and an acknowledgment from the recording medium in response to the command.

* * * * *